United States Patent
Takizawa et al.

(10) Patent No.: US 9,028,704 B2
(45) Date of Patent: May 12, 2015

(54) MAGNETIC RECORDING MEDIUM AND METHOD OF MANUFACTURING

(71) Applicants: Kazutaka Takizawa, Kanagawa (JP); Akira Watanabe, Kanagawa (JP); Kaori Kimura, Kanagawa (JP); Takeshi Iwasaki, Tokyo (JP); Akihiko Takeo, Tokyo (JP)

(72) Inventors: Kazutaka Takizawa, Kanagawa (JP); Akira Watanabe, Kanagawa (JP); Kaori Kimura, Kanagawa (JP); Takeshi Iwasaki, Tokyo (JP); Akihiko Takeo, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 114 days.

(21) Appl. No.: 13/659,749

(22) Filed: Oct. 24, 2012

(65) Prior Publication Data

US 2014/0002929 A1    Jan. 2, 2014

(30) Foreign Application Priority Data

Jun. 29, 2012   (JP) ................................ 2012-147763

(51) Int. Cl.
  *B44C 1/22* (2006.01)
  *G11B 5/31* (2006.01)
(52) U.S. Cl.
  CPC ............ *G11B 5/3163* (2013.01); *G11B 5/3116* (2013.01)
(58) Field of Classification Search
  None
  See application file for complete search history.

(56) References Cited

U.S. PATENT DOCUMENTS

| | | | |
|---|---|---|---|
| 2008/0260941 A1* | 10/2008 | Jin | 427/126.4 |
| 2009/0142625 A1* | 6/2009 | Fukushima et al. | 428/846.9 |
| 2011/0032223 A1 | 2/2011 | Okamoto | |
| 2011/0227136 A1* | 9/2011 | Park et al. | 257/288 |
| 2012/0206834 A1 | 8/2012 | Ueda | |

FOREIGN PATENT DOCUMENTS

| | | |
|---|---|---|
| JP | H06-060439 | 3/1994 |
| JP | 2010009709 | 1/2010 |
| JP | 2011129210 | 6/2011 |
| WO | WO 2011049120 A1 * | 4/2011 |

OTHER PUBLICATIONS

Nealey et el. "Self-assembling resist for nanolithography", IEEE (2005).*

* cited by examiner

*Primary Examiner* — Shamim Ahmed
*Assistant Examiner* — Bradford Gates
(74) *Attorney, Agent, or Firm* — Patterson & Sheridan, LLP

(57) ABSTRACT

A manufacturing method of a magnetic recording medium includes follows: forming a magnetic recording layer on a substrate; forming an under layer and a metal release layer that forms an alloy with the under layer on the magnetic recording layer in this order and forming an alloyed release layer by alloying the under layer and the metal release layer; forming a mask layer on the alloyed release layer; forming a resist layer on the mask layer; providing a protrusion-recess pattern by patterning the resist layer; transferring the protrusion-recess pattern to the mask layer; transferring the protrusion-recess pattern to the alloyed release layer; transferring the protrusion-recess pattern to the magnetic recording layer; dissolving the alloyed release layer by using a stripping solution and removing a layer formed on the alloyed release layer from an upper side of the magnetic recording layer.

10 Claims, 15 Drawing Sheets

MAGNETIC RECORDING MEDIUM AND METHOD OF MANUFACTURING

CROSS REFERENCE TO RELATED APPLICATION

This application is based upon and claims the benefit of priority from Japanese Patent Application No. 2012-147763, filed on Jun. 29, 2012; the entire contents of (if multiple applications, all of) which are incorporated herein by reference.

FIELD

Embodiments described herein relate to a magnetic recording medium and a method of manufacturing.

BACKGROUND

In recent years, the amount information to be processed, stored, and communicated has increased significantly, creating a demand for high capacity information recording devices. In hard disk drive (HDD) technology, various technological advancements particularly those related to perpendicular magnetic recording have achieved a desired increase in a recording density. Configurations for discrete track and/or bit patterned magnetic media which provide an increase in the recording density and keep the effects of thermal fluctuations within acceptable tolerances have been proposed. Development of manufacturing technology to produce such proposed configurations is urgently needed.

In a pattern of magnetic cells in a medium, each magnetic cell needs to be magnetically separated from other cells to provide storage for one bit of information (data) in each cell of a bit patterned medium. Using microfabrication technology, magnetic cells (e.g., dot shaped areas) and nonmagnetic regions are often formed in the same plane of a medium. A method for selectively deactivating the magnetic property of selected portions the recording medium by injecting an ionized different-type element can be used to make the nonmagnetic regions. Microfabrication patterns are generally used in the process of creating such structures.

Specifically, semiconductor manufacturing patterning is performed to create a magnetic region and a nonmagnetic region on a magnetic recording layer of a substrate which are independent and separate. A mask for a patterning to transfer a fine protrusion-recess pattern is formed on a magnetic recording layer, and that particular protrusion-recess pattern is produced on a magnetic recording medium underlying the magnetic recording layer upon further selective material removal processes are used to remove material after the protrusion-recession pattern is provided thereon.

A general-purpose resist material as is commonly used in semiconductor manufacturing processes is used to create protrusions and recesses in the mask pattern. A methods to obtain desired resist patterns include selectively creating a pattern by using an irradiating energy beam and selectively patterning a self-assembling film containing a resist film in which a chemically different pattern (or arrangement) is used. Another method uses irradiation to inject high energy ions into the magnetic recording layer to deactivate magnetization portions of a pattern after the protrusion-recession is provided to a mask pattern, so that the pattern defines magnetically separate regions in the medium.

When a mask pattern remains on the magnetic recording layer, a protrusion part that forms a magnetic dot (region) creating a high area above adjacent structures which may cause a magnetic head performing writing or recording to the magnetic recording medium on the medium to crash. Also, when the distance between the magnetic recording layer and the magnetic head is large, a signal to noise (S/N) ratio of signals that can be detected by the magnetic head becomes small. Therefore, the height of the protrusion part above surrounding/adjacent structures should be minimized by removing the mask pattern on the magnetic recording layer after the patterning of the magnetic recording layer. A release layer is provided between the magnetic recording layer and the mask layer in a practical process. The mask layer is removed from the upper side of the magnetic recording layer by dissolving the release layer, and the planarity of the medium is improved (i.e., roughness is reduced), so that a favorable head to magnetic recording medium glide property is obtained.

In a stripping process of a bit patterned medium, in addition to a stripping method in which a carbon film is exposed in an oxygen plasma atmosphere and a dry etching is performed, there is also a stripping method in which a metal film is used as a release layer and a wet etching using an acid, etc. as a stripping solution is performed. In dry etching, unremoved particles remain after the mask process becomes a transfer mask, the unremoved particles also remain on the medium surface after the dry etch stripping process which contributes to a degradation of a head disk interface (HDI) property. On the other hand, in the wet etching, the unremoved particles are lifted off from the mask by dissolving the release layer, so the amount of residue on the medium surface is reduced and the HDI property is improved.

Because the release layer used in the wet stripping eventually becomes an under layer of the mask layer that is provided in a further upper portion, pattern size variation from layer to layer in subsequent processes is reduced. In order to maintain the planarity, it is desired that the surface roughness of the release layer be small.

On the other hand, it is necessary to transfer the protrusion-recess pattern to the release layer before the magnetic recording layer is processed. However, the mask layer at that time includes recesses, so subsequent processing requires tight process control, i.e., the allowable variation processing in subsequent processing of the magnetic recording layer is narrowed. Following the teachings of conventional technology, to obtain acceptable tolerances of the parameters for satisfactory process control and the desired stripping process performance, a method for adjusting the thickness of the release layer is proposed. However, while the recess depth of the processed mask is reduced when the release layer is made thinner, the contact area on which the stripping solution acts is reduced, so that the amount of residue left after the stripping is increased. In contrast, when the film thickness of the release layer is thickened, the contact area available is increases and the stripping process efficiency is improved. However, the range of process variation to achieve acceptable processing of the thick release layer becomes narrow, and also the pattern size variation, which is caused by an increase in the surface roughness, becomes large. Therefore, an adjustment of the thickness of the release layer does not result in a satisfactory solution to the challenge of transferring a fine pattern of the release layer and performing the specified layer stripping process, therefore, it is desired to improve the processability, the stripping property, and the planarity of the release layer.

DETAILED DESCRIPTION

Figure 1:
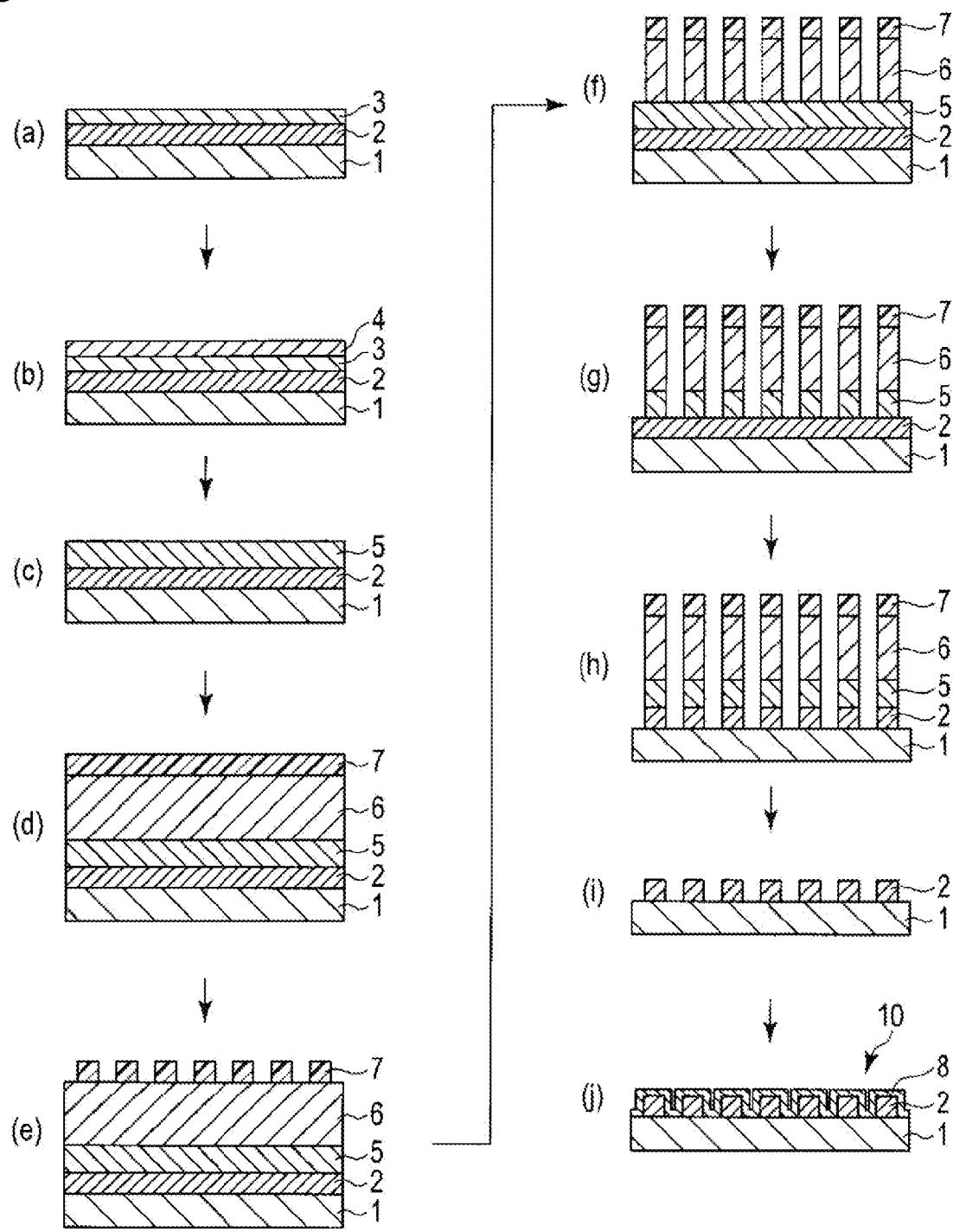
FIG. 1 is a view illustrating manufacturing steps of a magnetic recording medium according to a first embodiment.

According to disclosed embodiments in the application, a manufacturing method of a magnetic recording medium is provided, which includes: forming a magnetic recording layer on a substrate; forming an under layer and then a metal release layer on the magnetic recording layer and forming an alloyed release layer by alloying the under layer and the metal release layer; forming a mask layer on the alloyed release layer; forming a resist layer on the mask layer; providing a protrusion-recess pattern by patterning the resist layer; transferring the protrusion-recess pattern to the mask layer; transferring the protrusion-recess pattern to the alloyed release layer; transferring the protrusion-recess pattern to the magnetic recording layer; dissolving the alloyed release layer by using a stripping solution; and removing a layer formed on the alloyed release layer from an upper side of the magnetic recording layer. Also, another manufacturing method of a magnetic recording medium is provided, which includes: forming a magnetic recording layer on a substrate; forming a metal release layer and then an under layer on the magnetic recording layer and forming an alloyed release layer by alloying the under layer and the metal release layer; forming a mask layer on the alloyed release layer; forming a resist layer on the mask layer; providing a protrusion-recess pattern by patterning the resist layer; transferring the protrusion-recess pattern to the mask layer; transferring the protrusion-recess pattern to the alloyed release layer; transferring the protrusion-recess pattern to the magnetic recording layer; dissolving the alloyed release layer by using a stripping solution; and removing an upper mask from an upper side of the magnetic recording layer.

Hereinafter, embodiments will be described with reference to the drawings.

A manufacturing method of a magnetic recording medium according to the embodiments includes the following steps: a step for forming a magnetic recording layer on a substrate; a step for forming an alloyed release layer on the magnetic recording layer; a step for forming a mask layer on the alloyed release layer; a step for forming a resist layer on the mask layer; a step for forming a protrusion-recess pattern on the resist layer; a step for transferring the protrusion-recess pattern to the mask layer; a step for transferring the protrusion-recess pattern to the alloyed release layer; a step for transferring the protrusion-recess pattern to the magnetic recording layer; and a step for stripping a layer remained on the magnetic recording layer together with resolving the alloyed release layer by immersing a sample in a solution.

The embodiments are divided into two types of methods.

According to the first embodiment, in the step for forming the alloyed release layer, an under layer and a metal release layer that forms an alloy with the under layer are formed on the magnetic recording layer in this order, and the under layer and the metal release layer are alloyed.

According to the second embodiment, a metal release layer and an under layer that forms an alloy with the metal release layer are formed on the magnetic recording layer in this order, and the under layer and the metal release layer are alloyed.

According to the first and second embodiments, the under layer is made of a material that is easy to be alloyed with the metal release layer, and a surface roughness of the release layer is reduced due to the alloying. The alloyed release layer that is formed by alloying the under layer and the metal release layer has a component incline between an under layer material and a metal release layer material. Also, a surface roughness of the under layer is larger than those of the metal release layer.

The metal release layer is made of tungsten or aluminum, and the alloy layer can be formed by alloying with the under layer.

According to the manufacturing methods of the magnetic recording medium according to the first and second embodiments, the surface roughness of the alloyed release layer formed by alloying the under layer with the metal release layer is small, and variation in a pattern size along with the process can be reduced. Also, because processability and stripping property are compatible with each other, location dependency of the protrusion-recess transfer accuracy becomes small, so that a magnetic recording medium that has a superior in-plane evenness of the pattern that can be manufactured.

As a method for providing the protrusion-recess pattern onto the resist layer, given are, for example, a lithography using energy rays, a nanoimprint (nanoimprinting), a patterning method using a mask using a self-assembling film which consists of a block co-polymer which has at least two or more types of polymer chains, or a metal fine particle as a mask. In a case where the self-assembling film is used, after a micro phase separation structure is formed in the film, one type of polymer phase is selectively removed, and a remained polymer phase is used as a mask, so that the protrusion-recess pattern can be transferred. Also, in a case where a metal fine particle mask is used, by using a metal fine particle distributed on the same plane as an independent mask layer, the protrusion-recess pattern is transferred.

FIG. 1 is a view illustrating manufacture steps of the magnetic recording medium according to the first embodiment.

First, a magnetic recording medium in which a magnetic recording layer is formed on a substrate is prepared.

As illustrated in FIG. 1(a), an under layer 3 is formed on a magnetic recording layer 2 provided on a substrate 1.

Next, as illustrated in FIG. 1(b), a metal release layer 4 is formed on the under layer 3. As illustrated in FIG. 1(c), the under layer 3 and the metal release layer 4 are alloyed with each other and an alloyed release layer 5 is formed.

Next, as illustrated in FIG. 1(d), a mask layer 6 and a resist layer 7 are formed on the alloyed release layer 5. As illustrated in FIG. 1(e), the resist layer 7 is patterned and a resist pattern is formed.

Next, as illustrated in FIG. 1(f), the mask layer 6 is patterned through the resist pattern and a mask pattern is formed.

Next, as illustrated in FIG. 1(g), the alloyed release layer 5 is patterned through the mask pattern.

Next, as illustrated in FIG. 1(h), the magnetic recording layer 2 is patterned through the patterned alloyed release layer 5.

After that, as illustrated in FIG. 1(i), the alloyed release layer 5 is dissolved by a stripping solution, and the alloyed release layer 5, the mask layer 6 formed thereon, and the resist layer 7 are stripped and removed. As a result, the substrate 1 and the patterned magnetic recording layer 2 provided thereon are obtained.

Furthermore, a protective layer 8 is formed on the patterned magnetic recording layer 2, and the magnetic recording medium 10 can be obtained.

Figure 2:
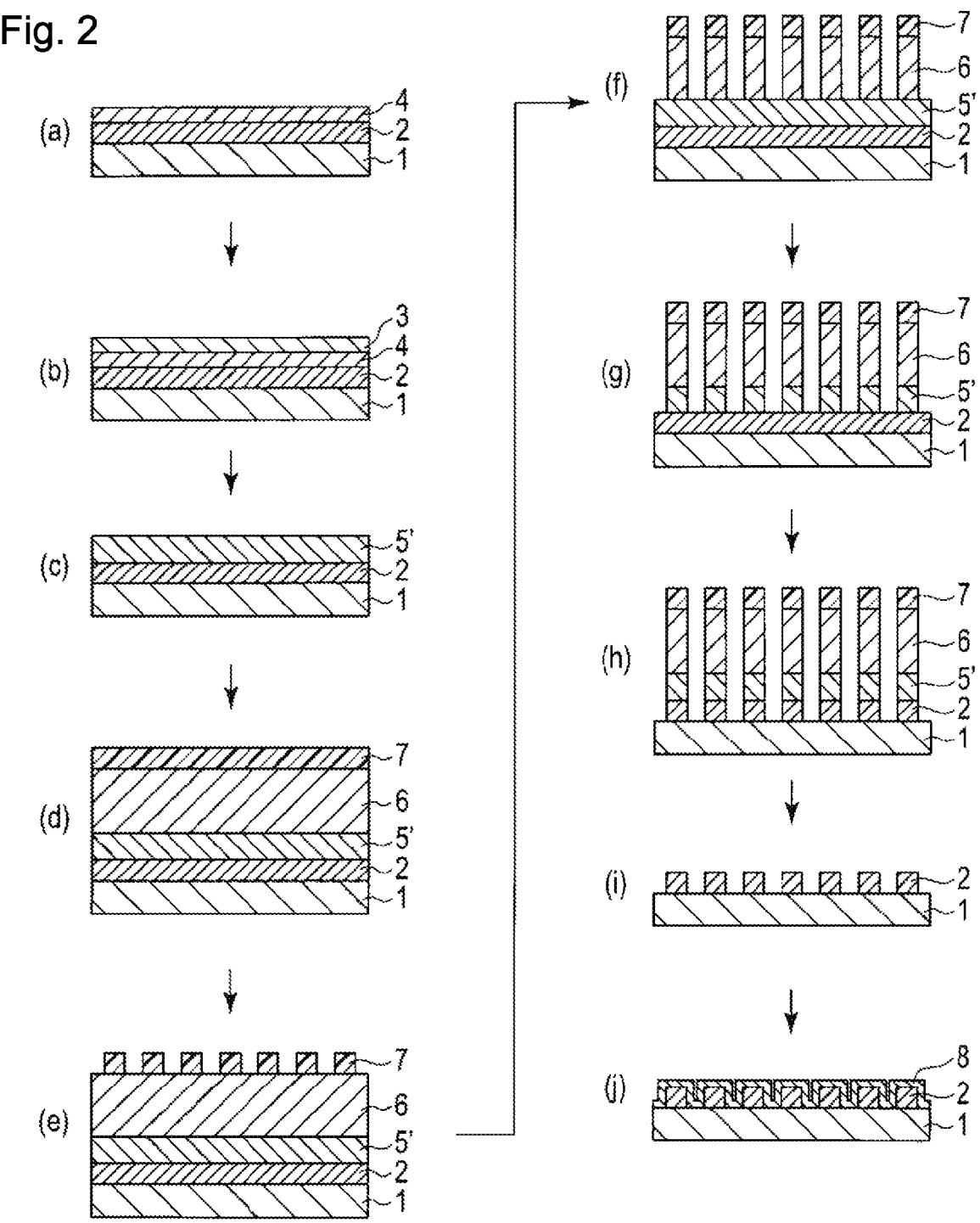
FIG. 2 is a view illustrating manufacturing steps of a magnetic recording medium according to a second embodiment.

FIG. 2 is a view illustrating manufacture steps of a magnetic recording medium according to the second embodiment.

In the manufacture steps of the magnetic recording medium according to the second embodiment, as illustrated in FIG. 2(a), the metal release layer 4 is formed on the magnetic recording layer 2 provided on the substrate 1. Next, as illustrated in FIG. 2(b), the under layer 3 is formed on the metal release layer 4. As illustrated in FIG. 2(c), the metal release layer 4 and the under layer 3 are alloyed with each other and a second alloyed release layer 5' is formed. Other than the above-described steps, the manufacture steps of the magnetic recording medium according to the second embodiment include the steps the same as FIG. 1.

Magnetic Recording Layer Formation Step

First, a magnetic recording layer is formed on a substrate and a magnetic recording medium is obtained.

There is no limitation for a shape of the substrate, but normally a substrate having a round shape and being hard is used. For example, a glass substrate, a metal contained substrate, a carbon substrate, a ceramics substrate, etc. are used. In order to obtain a favorable in-plane evenness of a pattern, roughness of the substrate surface is preferably small. It is also possible to form a protective film such as an oxide film on the substrate surface as necessary.

For a glass substrate, it is possible to use amorphous glass represented by soda-lime glass and aluminosilicate glass and crystallized glass represented by lithium system glass. Moreover, for a ceramics substrate, it is possible to use a sintered compact substrate of which main components are alumina, aluminum nitride, and silicon nitride.

On the substrate, a magnetic recording layer having a perpendicular magnetic recording layer of which a main component is cobalt is formed.

Herein, between the substrate and the perpendicular magnetic recording layer, a soft under layer (SUL) that has high permeability can be formed. The soft under layer serves as a part of magnetic head function of returning a recording magnetic field from a magnetic head for magnetizing the perpendicular magnetic recording layer, and a steep and sufficient perpendicular magnetic field is applied to the recording layer of a magnetic field, and a recording-reproducing efficiency can be improved.

A material containing Fe, Ni, and Co, for example, can be used for the SUL. Out of such materials, an amorphous material which doesn't have crystal magnetic anisotropy, a crystal defect, or a particle border and shows an excellent soft magnetism can be preferably used. Lower noise of the recording medium can be attained by using a soft magnetic amorphous material. As the soft magnetic amorphous material, a Co alloy that contains Co as a main component and contains at least one type of Zr, Nb, Hf, Ti, and Ta, which is, for example, CoZr, CoZrNb, CoZrTa, etc. can be chosen.

Moreover, between the SUL and the substrate, an under layer can be provided for the improvement in adhesion of the SUL. As an under layer material, it is possible to use Ni, Ti, Ta, W, Cr, Pt, an alloy thereof, oxide thereof, nitride thereof, etc. For example, NiTa, NiCr, etc. can be used. In addition, the under layer may be configured in a plural layer manner.

Furthermore, between the SUL and the perpendicular magnetic recording layer, an intermediate layer made of a non-magnetic metal material can be provided. There are two functions of the intermediate layer: intercepting an exchange-coupling interaction between the SUL and the perpendicular magnetic recording layer and controlling crystallinity of the perpendicular magnetic recording layer. As an intermediate layer material, Ru, Pt, Pd, W, Ti, Ta, Cr, Si, an alloy thereof, oxide thereof, or nitride thereof can be chosen.

The perpendicular magnetic recording layer contains at least Pt while containing Co as a main component and also can contain a metal oxide. In addition to Co and Pt, one or more of elements chosen from B, Ta, Mo, Cu, Nd, W, Nb, Sm, Tb, and Ru can be contained. By the above-mentioned elements contained, the fineness of particle of a magnetic particle can be increased, and crystallinity and an orientation property can be improved. Thereby, a record reproduction property and a thermal fluctuation property that are suitable for high recording density can be obtained. For the perpendicular magnetic recording layer, specifically alloys such as a CoPt system alloy, a CoCr system alloy, a CoCrPt system alloy, CoPtO, CoPtCrO, CoPtSi, CoPtCrSi, CoCrSiO$_2$, or the like can be used. The thickness of the perpendicular magnetic recording layer is preferably 5 nm or more in order to measure a reproduction output signal with high accuracy, and is preferably 40 nm or less in order to suppress distortion of signal intensity. When the thickness is thinner than 5 nm, there is a tendency that the reproduction output is extremely small and a noise component is predominance. On the contrary, when the thickness is thicker than 40 nm, there is a tendency that the reproduction output becomes excessive and that distortion in a signal waveform may occur.

A protective layer can be provided in a perpendicular magnetic recording layer upper portion. The protective layer has an effect that prevents damage on the medium surface produced when the magnetic head contacts the recording medium while preventing the corrosion and degradation of the perpendicular magnetic recording layer. As a protective layer material, materials that contain C, Pd, SiO$_2$, and ZrO$_2$ are given as examples. Carbon can be classified into sp$^2$ combined carbon (graphite) and sp$^3$ combined carbon (diamond). Durability and corrosion resistance are excellent in sp$^3$ combined carbon, and in contrast evenness is excellent in sp$^2$ combined carbon. Usually, film formation of carbon is performed by a sputtering method using a graphite target and an amorphous carbon in which $sp^2$ combined carbon and $sp^3$ combined carbon are mixed is formed. A carbon having a large ratio of $sp^a$ combined carbon is called diamond-like carbon (DLC). DLC is excellent in durability, corrosion resistance, and evenness, and is suitable as the protective layer of the magnetic recording layer.

A lubricant layer can be further provided in an upper portion of the protective layer. As lubricant used for the lubricant layer, given as examples are perfluoropolyethers, fluorinated alcohol, fluorinated carboxylic acid, etc. As described above, the perpendicular magnetic recording medium is formed on the substrate.

Under Layer Formation Step

Next, the under layer is formed on the magnetic recording layer. The under layer is configured to reduce surface roughness of the release layer. A portion of the under layer is also removed from the upper side of the magnetic recording layer when the wet etching is performed after the under layer and the metal release layer provided on the under layer are alloyed, so that the under layer is eventually removed from the upper side of the magnetic recording layer.

Here, alloying means forming a layer having a composition inclination by dissolving or diffusing an under layer material and a metal release layer material with each other. In other words, in a case of a binary system made of a material A and a material B, a material composition incline may be, from the substrate side or the mask layer side, AB alloy, BA alloy, A rich/AB/B rich, B rich/BA/A rich, A rich/AB/BA/B rich, B rich/BA/AB/A rich, AB/B rich, BA/A rich, A rich/AB, and B rich/BA. Here, A rich and B rich mean compositions that the content of the other metal material is small enough.

The under layer can be regarded as a portion of the single layer of the alloyed release layer by allowing with the metal release layer as mentioned above. Therefore, a portion having the composition incline is also stripped from the upper side of the magnetic recording layer.

In addition, the alloyed release layer may be formed using a ternary or more material. However, in order to suppress the variation in the process size accompanying the increase in the surface roughness, the material is preferably configured of a binary systems material.

The material of the under layer is preferably chosen from materials that is easily reacted and alloyed with the upper metal release layer. For example, the material is chosen from the group of Pd, Si, Ti, V, Zn, Ni, Mo, Cr, Cu, Zr, Nb, Hf, Ta, Ag, and Au.

Moreover, uniform alloying can be realized by giving variation in the roughness of the layers as will be mentioned below. Specifically, the layers need only be formed such that the surface roughness of the under layer is larger than the surface roughness of the metal release layer. Therefore, the surface area of the under layer becomes larger than the surface area of the metal release layer, so that alloying of the metal is promoted. It is possible to set a film formation condition for realizing this beforehand. In addition, when the under layer is formed, pre-treatment for an adherence improvement with the magnetic recording layer may be performed.

Such under layer is formed by a physical vapor deposition (PVD) represented by a vacuum evaporation method, an electron-beam evaporation method, a molecular-beam deposition method, an ion-beam deposition method, an ion-plating method, and the sputtering method, and a chemical vapor deposition (CVD) using heat, light, and plasma, etc.

In a physical/chemical vapor growth method, the thickness of the release layer can be arbitrarily adjusted by changing parameters, such as a process gas pressure, a gas flow rate, substrate temperature, input power, an ultimate vacuum, chamber atmosphere, and film formation period. It is also possible to adjust the surface roughness of the under layer by changing the above-mentioned film formation condition. As a condition which makes the roughness of the under layer larger, given as examples are setting a process gas pressure high and a substrate voltage application by a bias sputtering method etc.

Metal Release Layer Formation Step and Alloying Step

Then, the metal release layer is formed in an upper portion of the under layer. The metal release layer is used to release layers formed on the metal release layer, and also the surface roughness of the release layer is reduced by alloying the under layer. In this case, because the surface roughness becomes smaller than the case where a monolayer release layer is used, the size variation in a pattern is reduced, and also the location dependency of the releasing of the release layer becomes small by the above-mentioned uniform alloying. Therefore, a magnetic recording medium with the small size variation of a pattern and the small location dependency of a pattern is realizable.

An material of the metal release layer can be chosen from the group of various inorganic materials of, for example, Mo, Zn, Co, Ge, Al, Cu, Au, Ni, Nb, W, Cr, etc., and the metal release layer is preferably configured of a material having a high reactivity with the under layer. For example, tungsten is especially preferably used in acid stripping, and aluminum especially preferably used in alkali stripping, so that the alloyed release layer having the small roughness is obtained by alloying with the under layer.

Favorable alloying can be promoted by forming the metal release layer such that the value of the roughness becomes small as compared to the value of the surface roughness of the under layer. This is because the area of the metal release layer that contacts the under layer with a large surface area increases as described above. As a specific and easy method, the film formation condition may be variously adjusted, and, for example, a low-pressure sputtering method, etc. correspond this.

As for the metal release layer, it is also possible to laminate the materials chosen from the material group having a high reactivity. However, it is preferred to use this in a single-layer manner because the pattern size variation may become larger by the increase of the surface roughness accompanying the increase in the film thickness and also a processing margin may decrease.

After laminating the under layer and the metal release layer, an annealing treatment may be performed for promoting alloying. A method of performing substrate heating after film formation in a vacuum chamber, and a method of heating in an oven after unloading a sample from a vacuum chamber are given as examples; however it is preferred to perform substrate heating immediately after film formation from the perspective of manufacture efficiency. In addition, a film formation may be performed while the substrate is heated. In order to reduce the variation of the surface roughness process size of the alloyed release layer, it is desired to set in the range of 0.6 nm or less. In the range of the above-described value, the thicknesses of the under layer and the alloyed release layer can be variously set. When the surface roughness becomes larger than 0.6 nm, the size variation in process becomes larger, and also the reduction of the process margin becomes remarkable.

Mask Layer Formation Step

The mask layer is formed in an upper portion of the alloyed release layer for transferring the protrusion-recess pattern.

Because the mask layer serves as a main mask in a process of the magnetic recording layer, it is preferred to use a material that can maintain an etching selectivity. As specific material, given as examples are Al, C, Si, Ti, V, Cr, Mn, Co, Ni, Cu, Fe, Zn, Ga, Zr, Nb, Mo, Ru, Pd, Ag, Au, Hf, Ta, W, Pt, etc. Materials that are compounds thereof or alloys thereof can also be applied to a mask layer. In this case, a mask material that can secure an etching selectivity with respect to the protrusion-recess pattern of the resist layer formed on the mask layer and a film thickness thereof are suitably determined.

The mask layer can be formed by the PVD or the CVD like the under layer and the metal release layer.

The thickness of the mask layer can be determined considering the etching selectivity between the release layer and the magnetic recording layer and a protrusion-recess pattern size. For film formation of the mask layer, adjustment can be performed by changing parameters, such as a process gas pressure, a gas flow rate, substrate temperature, input power, an ultimate vacuum, chamber atmosphere, and film forming period, for example. Rare gas such as Ar is mainly used as sputtering gas used for film formation, and also a desired alloy can be formed by mixing reactant gases, such as $O_2$ and $N_2$, depending on the mask material to be formed.

A transfer uniformity of the protrusion-recess pattern of the resist layer formed in the upper portion of the mask layer largely depends on the surface roughness of the mask layer. Therefore, in the mask layer, it is desired to keep the surface roughness lower and the surface roughness can be reduced by using a material of crystalline substance but amorphous substance.

Moreover, single layer or two or more layers of mask layer(s) can be formed. It is also possible to use a stack in which a first mask layer that is the mask layer on the release layer, a second mask layer, and a third mask layer are laminated. In this case, it is possible to use a multilayer body that is configured with a first layer and a second layer that is made of a different material from those of the first layer. Herein, for the sake of convenience, a second mask layer is called a transfer layer with respect to the first mask layer.

Figure 3:
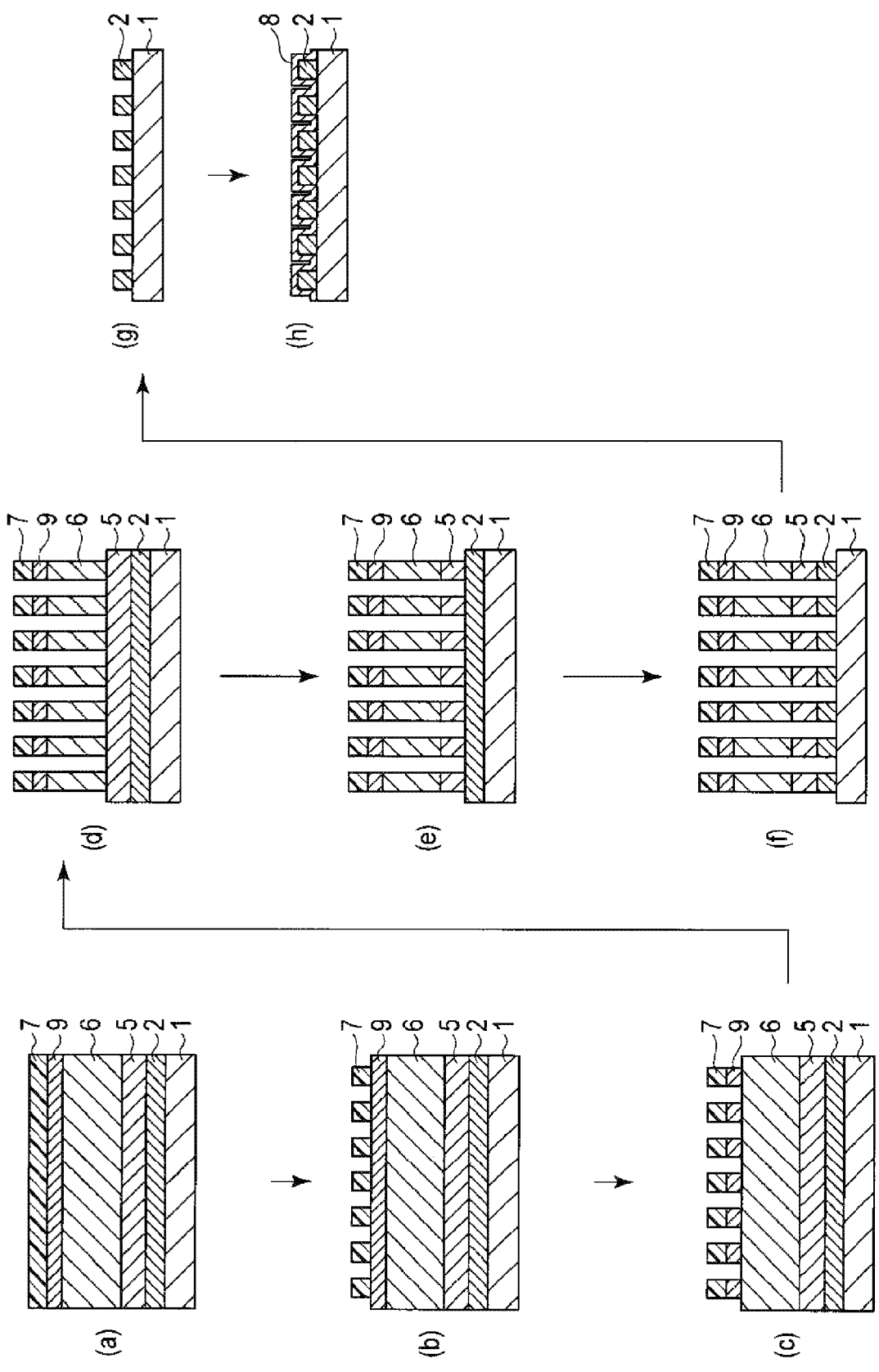
FIG. 3 illustrates one example of a manufacturing method of the magnetic recording medium according to the first embodiment.

FIG. 3 illustrates one example of a manufacturing method of the magnetic recording medium in a case where a transfer layer is provided between the mask layer (first mask layer) and the resist layer.

FIG. 3 illustrates another example of the manufacturing method of the magnetic recording medium according to the first embodiment.

In processes illustrated in FIG. 3(a) through FIG. 3(h), a transfer layer 9 is formed between the mask layer 6 (first mask layer) and the resist layer 7, and a step of patterning the transfer layer 9 through a resist pattern illustrated in FIG. 3(c) is added between the step for forming the resist pattern of FIG. 1(e) and the step for forming the mask pattern of FIG. 1(f). Other than the above-described things, the steps illustrated in FIG. 3(a) through FIG. 3(h) are almost the same as the steps of FIG. 1(d) through FIG. 1(j).

When a combination of mask materials is determined, a metal material corresponding to an etching solution or etching gas can be selected. In a case where some materials are combined considering dry etching, given as examples are, from the substrate side, C/Si, Si/Al, Si/Ni, Si/Cu, Si/Mo, Si/MoSi$_2$, Si/Ta, Si/Cr, Si/W, Si/Ti, Si/Ru, Si/Hf. And, a configuration is also applicable in which Si is replaced with SiO$_2$, Si$_3$N$_4$, SiC, etc. Also a stack made of Al/Ni, Al/Ti, Al/TiO, Al/TiN, Cr/Al$_2$O$_3$, Cr/Ni, Cr/MoSi$_2$, Cr/W, GaN/Ni, GaN/NiTa, GaN/NiV, Ta/Ni, Ta/Cu, Ta/Al, Ta/Cr, etc. can be selected.

The combination and the lamination order of the mask materials are not necessarily limited to the above-mentioned thing, and can be appropriately chosen from the perspectives of the pattern size and the etching selectivity. Also, because it is possible to perform patterning by wet etching as well as dry etching, the mask materials can be selected in consideration of this.

In a case the mask layer is patterned by wet etching, side etching with respect to the width direction of the protrusion-recess pattern is suppressed. In this case, the patterning is realizable by setting various parameters such as composition of the mask materials, the concentration of an etching solution, and etching period.

Resist Layer Formation Step

Next, a resist layer for forming the protrusion-recess pattern is formed on the mask layer.

For the formation of the fine protrusion-recess pattern on the resist layer, a resist for ultraviolet rays and electron beam exposure represented by a novolac resin etc., a resist for nanoimprint that has a hardening function due to heat and an ultraviolet exposure, a self-assembling film of a macromolecule, a metal fine particle, etc. are applicable.

A resist layer used for performing an exposure or nanoimprint can be formed by applying a precursor solution of a resist material. In this case, the thickness of the resist layer can be determined in consideration of a patterning pitch and the etching selectivity to the mask layer that is a lower layer.

For application of the solution, the application can be performed onto the substrate by various methods, such as a spin coating method, a spray coating method, a spin casting method, a dip coating method, and an ink jet method. Because the resist layer immediately after the application contains a large amount of solvents, a pre-bake can be performed to lower the fluidity of the resist material. When the adherence of the resist layer to the mask layer is unfavorable, a pre-treatment on the mask layer surface can be performed. Specifically, given as examples are a baking treatment for moisture removal of the mask layer, and a water repellent treatment such as application of a hexamethyldisilazane solution.

The resist layer is not limited to a single layer structure. The resist layer may be configured with a multilayer structure in which, for example, plural resist layers having different exposure sensitivities are laminated according to the transfer step.

Also, there is no limitation with respect to the type of resist material, and it is possible to use various resist materials, such as a main chain cleaved type, a chemical amplification type, and a bridged type.

It is also possible to form the self-assembling layer for forming the protrusion-recess pattern in the upper portion of the mask layer and transfer this to the protrusion-recess pattern. The self-assembling film is represented by a di-block copolymer having at least two different polymer chains, and a basic structure thereof is a structure in which the ends of the polymers that have different chemical characteristics from each other are covalent-bonded as (block A)-(block B). The self-assembling film is not limited to the di-block copolymer, and a tri-block copolymer and a random copolymer may be applicable depending on the combination of the material.

As a material that forms a polymer block, given as examples are polyethylene, polystyrene, polyisoprene, polybutadiene, polypropylene, polydimethylsiloxane, polyvinylpyridine, polymethylmethacrylate, polybutylacrylate, polybutylmethacrylate, polydimethal acryl amide, polyethylene oxide, polypropylene oxide, polyacrylic acid, polyethylene acrylic acid, polypropylacrylic acrylic acid, polymethacrylic acid, polylactide, polyvinyl carbazole, polyethylene glycol, polycaprolactone, polyvinylidene fluoride, polyacrylamide, etc., and a block co-polymer can be configured using two or more types of different polymers out of these.

The self-assembling film using the block co-polymer can be formed on the mask layer by a spin coating method, etc. In this case, a solvent that dissolves the polymers with each other configuring the phases is selected, and a solution made by dissolved this can be used as an application liquid.

As a specific solvent, given as example are toluene, xylene, hexane, heptane, octane, ethylene glycol monoethyl ether, ethylene glycol monomethyl ether, ethylene glycol monomethyl ether acetate, propylene glycol monomethyl ether acetate, ethylene glycol trimethyl ether, lactic acid ethyl, ethyl pyruvate, cyclohexanone, dimethylformamide, dimethylacetamide, tetrahydrofuran, anisole, diethylene glycol triethyl ether, etc.

The film thickness of the self-assembling film can be changed using the concentration of the application liquid using such solvent and various parameters that are set at the time of film formation.

In the self-assembling film, the polymers are separated in phases by given energy such as heat, so that micro phase separation structure is formed in the inside of the film. The micro phase separation structure presents a different aspect depending on the molecular weight, etc. of the polymer configuring the self-assembling film. For example, in di-block copolymer, an island shape of polymer B or a cylinder structure is formed on a backbone (matrix) of polymer A. Also, a lamellar structure in which the polymers A and B are laminated on the same plane, and a sphere structure in which the pattern of backbone and island is inversed may be formed. When either of the polymers in this pattern is selectively removed, the protrusions and recesses of the self-assembling film can be formed.

For formation of the micro phase separation structure of the self-assembling film, external energy is given. Giving energy can performed by an annealing using heat, or a so-called solvent annealing that exposes a sample into solvent atmosphere. When the thermal annealing is performed, a temperature at which an arrangement accuracy of the self-assembling film is not degraded is set.

In addition, in order to raise the arrangement accuracy of the self-assembling pattern, the upper portion of the mask layer may be chemically modified. Specifically, an arrangement of the block copolymer can be improved by applying either polymer phase configuring the block copolymer onto the mask surface. In this case, the surface modification in a molecular level can be performed by applying/annealing/rinsing of the polymer. By application of the above-mentioned block co-polymer solution onto this, it becomes possible to obtain a pattern with favorable in-plane uniformity.

Other than the above-described things, a metal fine particle that serves as a desired pattern pitch can be used as a mask. Because the fine particle itself correspond to a protrusion part of the mask layer when the metal fine particle is used as the mask layer, it is possible to transfer the pattern to the lower portion as long as this can be maintained.

Figure 4:
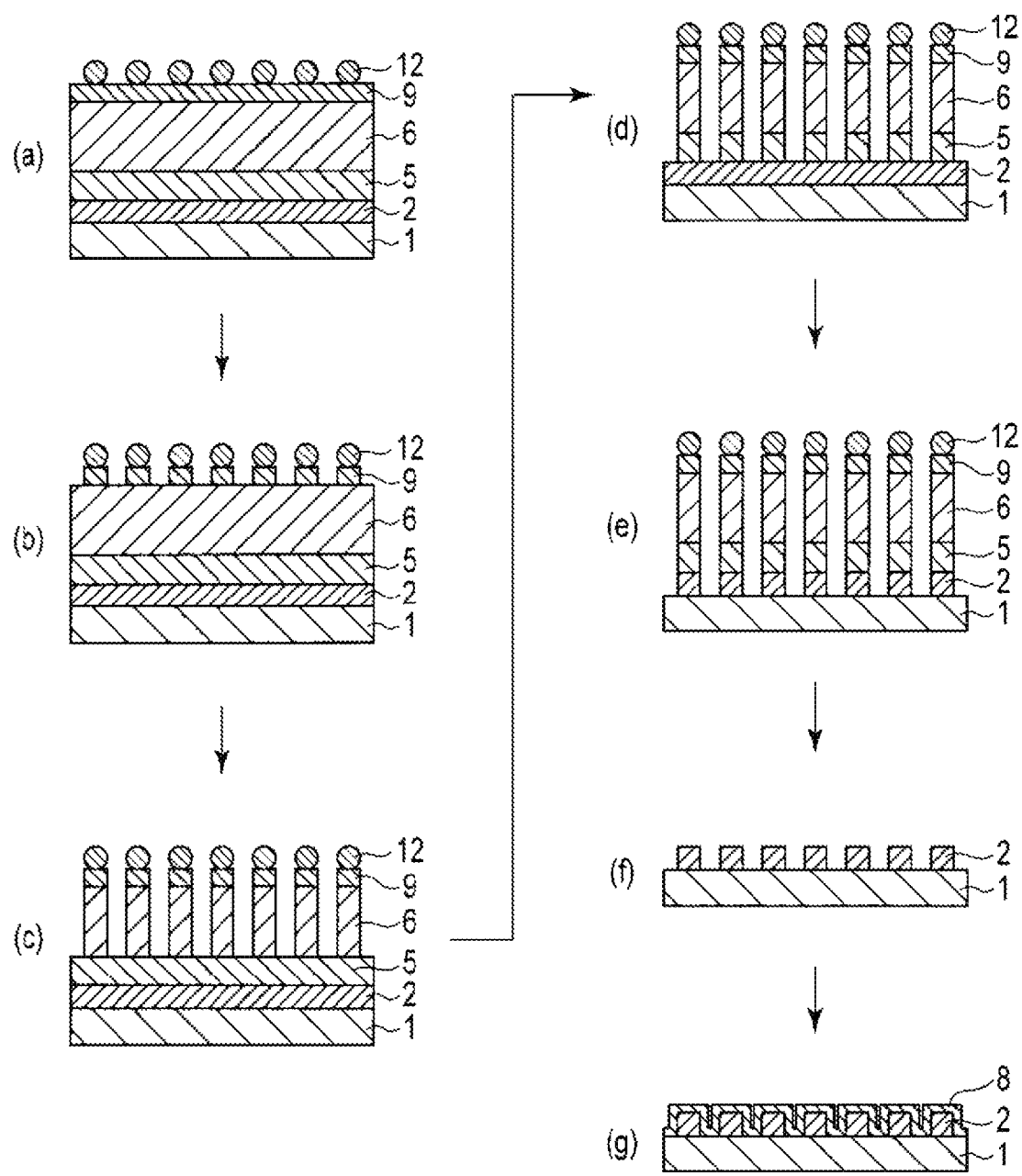
FIG. 4 illustrates another example of the manufacturing method of the magnetic recording medium according to the first embodiment.

FIG. 4 illustrates another example of the manufacturing method of the magnetic recording medium according to the first embodiment.

In processes illustrated in FIG. 4(a) through FIG. 4(g), a metal fine particle mask layer 12 is used instead of the resist layer 7, the transfer layer 9 is provided between the mask layer 6 (first mask layer) and the resist layer 7, and a step for patterning the transfer layer 9 through the resist pattern of FIG. 4(b) is added between the step for forming the resist pattern of FIG. 1(e) and the step for forming the mask pattern of FIG. 1(f). Other than the above-described things, the steps illustrated in FIG. 4(a) through FIG. 4(g) are almost the same as the steps of FIG. 1(e) through FIG. 1(j).

When the metal fine particle is used, aggregation of the fine particle in a fine particle dispersion liquid is suppressed beforehand. In this case, it is good to add a dispersion agent that reveals surface activity in the fine particle surface. Moreover, a secondary particle generated by the aggregation has a relatively large particle diameter and it leads to degradation of the uniformity of the pattern, so that it is preferred that filtering of the dispersion liquid has been suitably performed beforehand by a membrane filter, etc.

The solvent of the dispersion liquid can be changed so as to correspond to the surface property of the mask layer. Moreover, in order to reduce a region having macroscopic application unevenness where the metal fine particle is not evenly applied, it is possible to improve a coating property by adding binder made of a macromolecular material to the dispersion liquid, so that the dispersion liquid can be prepared by selecting a macromolecular material dissolvable to the solvent of the dispersion liquid.

Figure 5:
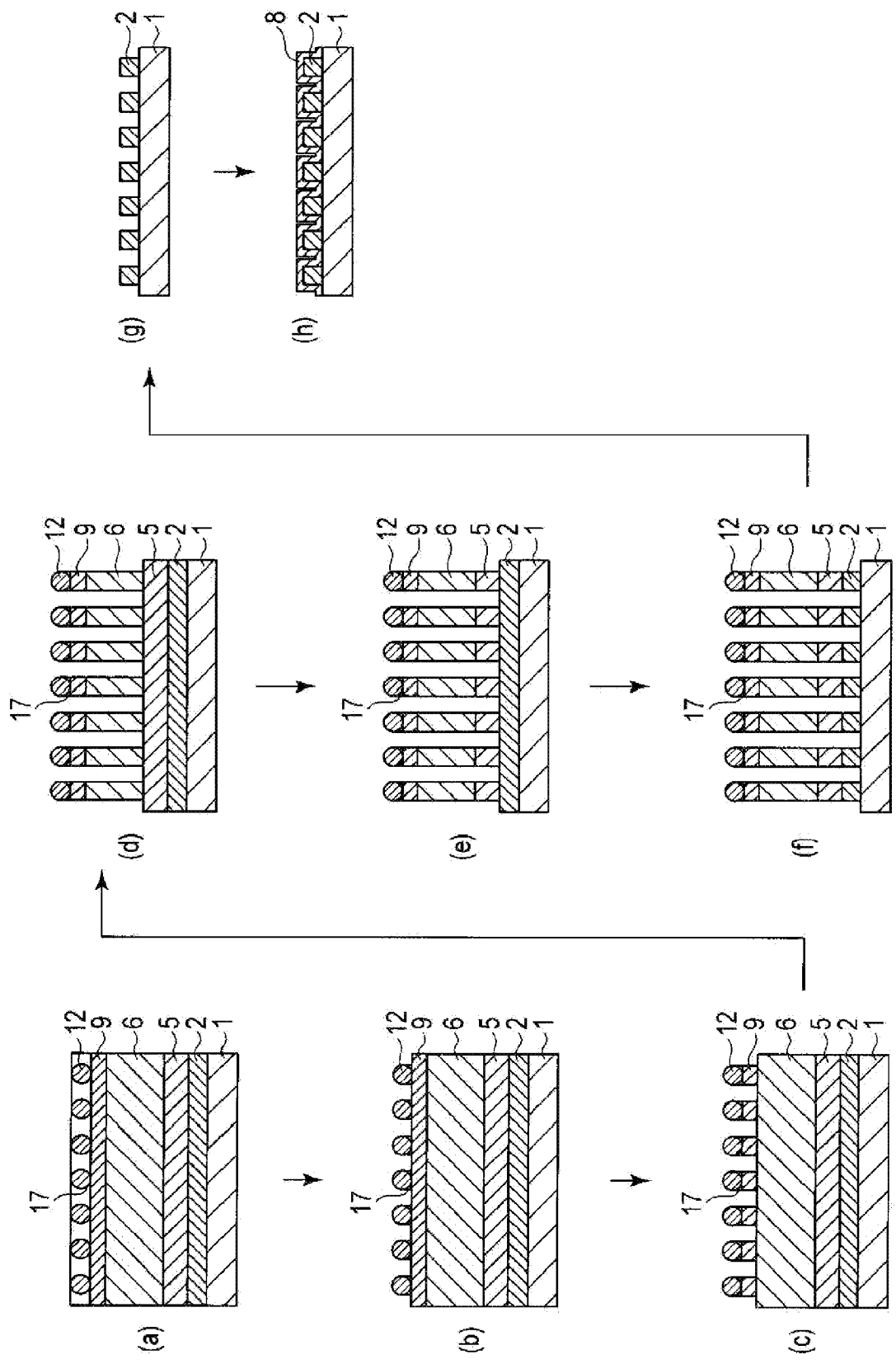
FIG. 5 illustrates another example of the manufacturing method of the magnetic recording medium according to the first embodiment.

FIG. 5 illustrates another example of the manufacturing method of the magnetic recording medium according to the first embodiment.

In processes illustrated in FIG. 5(a) through FIG. 5(h), a layer including the metal fine particle mask layer 12 and a binder 17 is used instead of the resist layer 7, the transfer layer 9 is provided between the mask layer 6 (first mask layer) and the resist layer 7, and a step for hardening the binder by baking the layer including the metal fine particle mask layer 12 and the binder 17 of FIG. 5(b) and the step for patterning the transfer layer 9 through the metal fine particle pattern of FIG. 5(c) are further added between the step for forming the resist pattern of FIG. 1(e) and the step for forming the mask pattern of FIG. 1(f). Other than the above-described things, the steps illustrated in FIG. 5(a) through FIG. 5(h) are almost the same as the steps of FIG. 1(e) through FIG. 1(j).

As well as a resist solution and a polymer solution of the self-assembling film, the metal fine particle dispersion liquid can be also applied onto the substrate by various methods such as a spin coating method. Under such circumstance, because the transfer evenness is degraded when the metal particle has focally a multilayer structure, it is possible to adjust a coating condition such that the metal fine particle has a monolayer structure over a large area on the substrate.

When the protrusion-recess pattern transfer by the resist layer is difficult, the transfer layer can be inserted between the mask layer and the resist layer. In this case, a material with which the etching selectivity between the resist layer and the mask layer can be secured can be selected.

Resist Layer Patterning Step

The protrusion-recess pattern is formed onto the resist layer by etching.

First, in order to form the protrusion-recess pattern onto the resist layer, an exposure using energy rays can be performed. As an exposure method, applicable are an ultraviolet beam exposure and an electron beam exposure such as KrF and ArF, a charged particle beam exposure, an X-ray exposure, etc. As well as an irradiation through an exposure mask, an interference exposure, a reduced projection exposure, a direct exposure, etc. can be performed. An exposure part becomes a latent image where the resist layer is chemically modified, and the protrusion-recess patter is obtained by developing this.

An example for forming a fine pattern by the electron beam exposure is explained. As for the electron beam drawing device, there are an x-y drawing device that has a moving mechanism of a stage with which the stage moves in two axis orientations that are a radiation direction of an electron beam and the direction orthogonal to the radiation direction and a x-θ drawing device that is formed by adding a rotation mechanism to a one axis moving mechanism. In a case of using the x-y drawing device, the stage can be continuously driven so that connector accuracy between drawing fields may not be degraded. Moreover, when a round pattern is drawn, the x-θ drawing device in which the stage is continuously rotated can be used.

Moreover, when a concentric circle pattern is formed, a deviation with respect to the electron beam as well as a stage driving system can be added. In this case, in order to independently control a deviation signal corresponding to a drawing pattern, an information processing device, which is called a signal source, is used. The signal source independently controls a deviation pitch and a deflection sensitivity of an electron beam, a feeding amount of the drawing stage, etc. Specifically, the drawing pattern having the concentric circle form can be formed by transmitting the deviation signal with respect to an electron beam and the moving signal of the stage for every rotation of the sample.

Subsequently, the resist film is patterned by performing a developing onto the latent image. As a developing solution for the resist film, an esters solvent such as methyl acetate, ethyl acetate, butyl acetate, amyl acetate, hexyl acetate, and octyl acetate, a ketone system solvent such as methyl ethyl ketone, methyl isobutyl ketone, and propylene glycol monoethyl acetate, an aromatic system solvent such as anisole, xylene, toluene, and tetralin, and an alcohol system solvent such as ethanol, methanol, and isopropyl alcohol, etc. can be used as an organic developing solution. Moreover, tetramethylammonium hydroxide, tetrapropylammonium hydroxide, etc. can be used as an alkali developing solution.

Then, wet rinse is performed, and the developing solution on the resist film is replaced and removed. A rinse liquid used herein and the developing solution are preferably dissolved into each other. As the rinse liquid, given as a representative example is isopropyl alcohol etc., but not limited to this as long as the relationship of dissolving into each other is satisfied. In the developing and the rinse, in addition to a parameter related to a solution, such as liquid temperature, viscosity, and a mixture ratio, a developing period is adjusted to obtain a desired pattern size.

Then, a desired resist protrusion-recess pattern is obtained by drying the rinse liquid on the resist film. As a drying method, a method of directly spraying inactive gas such as $N_2$ onto a sample, heat drying by heating the substrate as a temperature higher than the boiling point of the rinse liquid to volatilize the rinse liquid, spin drying, supercritical drying, etc. are applicable. As described above, the protrusion-recess pattern can be formed to the resist layer by electron beam lithography.

As another method of forming the protrusion-recess pattern to the resist layer, a method in which the self-assembling layer is applied to the resist layer and the protrusion-recess pattern is formed by etching is explained.

Figure 6:
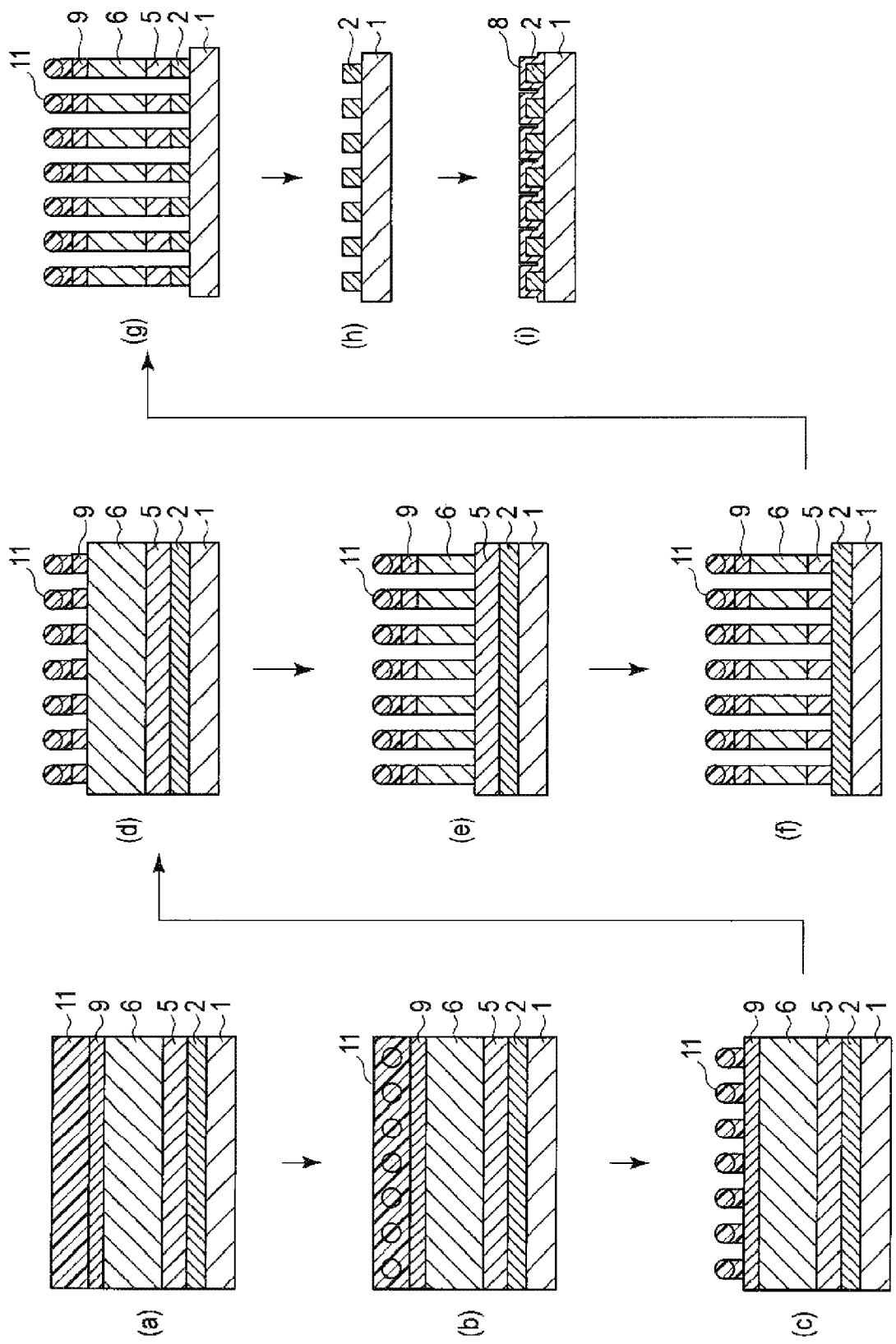
FIG. 6 illustrates another example of the manufacturing method of the magnetic recording medium according to the first embodiment.

FIG. 6 is a view for explaining another example of the manufacturing method of the magnetic recording medium according to the first embodiment.

As illustrated in the figure, the manufacture steps are the same as the FIG. 1 other than formation of a block copolymer film, which is a self-assembling layer that has at least two different types of polymer chains, as a type of the resist layer formed on the mask layer, and separation of the self-assembling layer in phases and selective removal of either polymer layer instead of the providing of the protrusion-recess pattern to the resist layer.

In steps illustrated in FIG. 6(a) through FIG. 6(i), the transfer layer 9 is provided between the mask layer 6 (first mask layer) and the former location of the resist layer 7, a self-assembling layer 11 is formed instead of the resist layer 7, a phase separation step of FIG. 6(b) and a step for forming a dot-shape pattern of island-shape of polydimethylpolysiloxane of FIG. 6(c) are performed instead of the step for forming the resist pattern of FIG. 1(e), and a step for patterning the transfer layer 9 through the dot-shape pattern of FIG. 6 is further added before the step for forming the mask pattern of FIG. 1(f). Other than the above-described things, the steps illustrated in FIG. 6(a) through FIG. 6(i) are almost the same as the steps of FIG. 1(d) through FIG. 1(j).

A protrusion-recess pattern is formed by selectively removing a phase in the block copolymer. For example, in a di-block copolymer made of a system of polystyrene-b-polydimethylsiloxane, a dot pattern of an island-shape polydimethylsiloxane is formed in a backbone of polystyrene by arbitrarily setting a molecular weight. A dot-shape protrusion-recess pattern of polystyrene-b-polydimethylsiloxane is obtained by selectively removing either polymer layer such as, for example, the backbone of polystyrene.

When the protrusion-recess of the self-assembling layer is formed by etching, a wet etching that immerses a sample into a medical liquid and a dry etching using chemical reaction due to activated species are applicable. When a highly precise pattern transfer to the thickness direction is performed, it is preferred to apply the dry etching that can suppress side etching with respect to the width direction of the fine pattern.

In the dry etching of a polymer phase, it is possible to perform a patterning so as to maintain the etching selectivity by choosing an activated gas type appropriately. Generally, the macromolecule material that contains a large amount of C and H as a benzene ring has high etching tolerance, and it is suitable as a mask for the protrusion-recess process. Because etching selectivity is larger when a material, such as a block copolymer, in which polymers having different compositions are arbitrarily combined, is used, the protrusion-recess pattern can be formed high precision. For example, in a polystyrene-b-polydimethylsiloxane, because polydimethylsiloxane is fluorine system gas such as $CF_4$ and polystyrene can be easily removed by using $O_2$ gas, so that the etching selectivity among both can be secured.

When it is difficult to directly transfer the self-assembling pattern to a lower layer mask, a transfer layer may be separately provided between the self-assembling film and the mask layer. For example, a mask material for which an etching gas that can remove either layer of the di-block polymer is used can be also used as the transfer layer. In a case of using polystyrene-b-polydimethylsiloxane as an example, polystyrene that is a backbone polymer can be etched by $O_2$ and thereby the polymer and the transfer layer are etched all together only by $O_2$ when the carbon film is used as the transfer layer. As a result, a process gas is not needed to replace, and manufacture efficiency is improved. In contrast, when the backbone polymer is polydimethylsiloxane, etching can be performed in the same manner by using a $CF_4$ gas and using Si as the transfer layer, so that the pattern is transferred all together. As described above, the protrusion-recess pattern of the resist layer is obtained using the micro phase separation pattern of the self-assembling film.

The protrusion-recess pattern can also be made of a metal fine particle material.

As described above, metal fine particle dispersion liquid is applied onto the mask layer and a monolayer fine particle layer is formed. Then, an etching is performed using the monolayer fine particle layer as a mask and the protrusion-recess pattern is obtained.

For performing an etching, an etching gas and an etching condition are set so as to secure etching selectivity between the metal fine particle and the lower mask layer. Also, in a case when a macromolecule binder for improving the application evenness of the metal fine particle is added to a dispersion liquid as described above, it can be regarded as that an island-shape metal fine particle pattern is dispersed in a backbone of the binder. In this case, the etching selectivity between the metal fine particle and the binder need only be secured, and a patterning process using the metal fine particle as a mask can be performed.

When a distance between the metal fine particles is remarkably narrow, the fine particle distance may be adjusted by intentionally etching the metal fine particles. As a specific method, given as examples are a method for making a side etched portion by dry etching larger, a method for sliming the width direction of the metal fine particle by adjusting an incident angle of an ion species in ion milling, etc.

It is also possible to provide the protrusion-recess pattern onto the resist layer by nanoimprint lithography.

In the nanoimprint, a pattern transfer is performed by pressing a nanoimprint stamper (hereinafter, referred to as a stamper) having a surface on which a fine protrusion-recess pattern is printed to a resist layer for transfer. As compared to a technology such as an ultraviolet-ray exposure and an electron beam exposure of a step and repeat system, the resist pattern can be transferred all together to a large area of a sample. As a result, a manufacture throughput is increased, and a shortened manufacture time and cost reduction can be realized.

The stamper can be made from a substrate having a fine protrusion-recess pattern formed by lithography etc., which is a so-called master plate (mold, plate), and in many cases, the stamper is prepared by electroforming to the fine pattern of the master plate. For a substrate for the master plate, a semiconductor substrate made of Si, $SiO_2$, SiC, SiOC, $Si_3N_4$, C, etc., or a semiconductor substrate made by doping an impurity such as B, Ga, In, and P can be used. Other than those, a substrate made of a material having conductivity can be used. Also, there is no limitation about a three-dimensional form of the substrate, and substrates having a circular shape, a rectangular shape, and a doughnut shape can be used.

A pattern of the master plate is formed by various lithography represented by electron beam exposure as described above. Herein, the formed protrusion-recess pattern of the resist layer is applicable as a pattern for electroforming, and can be also used as a pattern for electroforming after a protrusion-recess pattern is transferred to the master plate.

Next, an electroforming is performed to the protrusion-recess pattern of the master plate, and a stamper is prepared. Various materials can be given as a plating metal, but as one example, a preparing method of a stamper made of Ni is explained herein.

Figure 7:
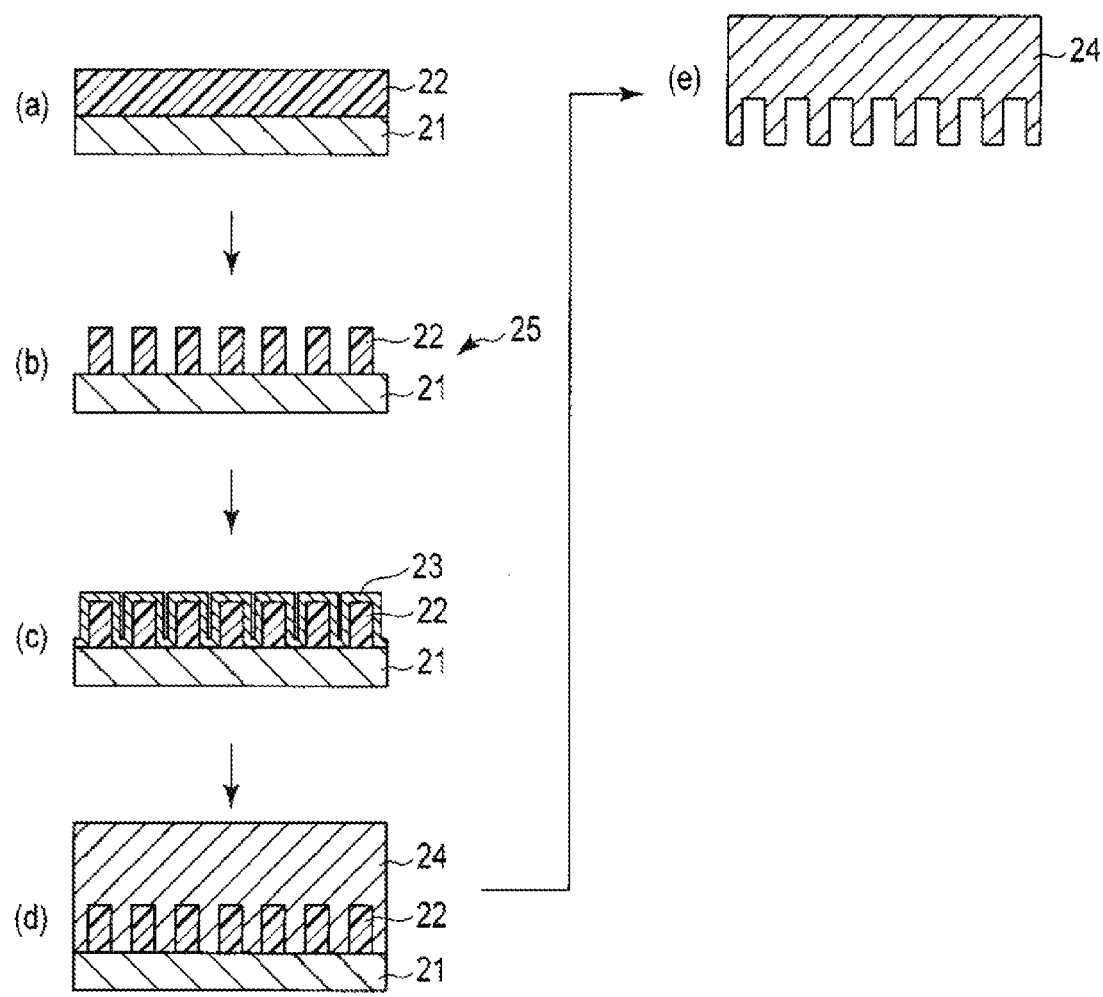
FIG. 7 is a view for explaining one example of a manufacturing method of a stamper.

FIG. 7 is a view for explaining one example of a manufacturing method of the stamper.

First, as illustrated in FIGS. 7(a) and 7(b), a master plate 25 that the protrusion-recess patterned resist layer 22 is formed on the substrate 21 is prepared. In order to provide conductivity to the protrusion-recess pattern of the master plate 25, a Ni thin film 23 is formed on a surface of the protrusion-recess pattern. In a case of electroforming, occurrence of conduction defection prevents plating growth and this may lead a pattern defect. Therefore, it is preferred that the Ni thin film 23 is evenly formed on the surfaces and side surfaces of the protrusion-recess pattern. Note, the conductive film (Ni thin film) 23 is prepared to provide conductivity, and a material thereof is not limited to Ni.

Then, the master plate 25 is immersed and turned on electricity in nickel sulfamate bath, and an electroforming layer that eventually becomes a stamper 24 is formed by performing electroforming. A film thickness after plating, which is a thickness of the stamper 24, can be adjusted by changing a density of hydrogen-ion, temperature, viscosity, flowing current value, plating time, etc. of the plating bath. The electroforming can be performed by electroplating or electroless plating.

The stamper 24, which is obtained as described above, is separated from the substrate 21. When the resist layer 22 remains on the protrusion-recess pattern surface of the stamper 24, the residue of the resist layer 22 can be removed by etching the protrusion-recess pattern surface, so that the protrusions and recesses can be exposed. Finally, the stamper 24 can be completed by mechanically removing unnecessary portions of the stamper 24 other than the protrusion-recess patterned sides, and also processing into a preferred form such as a circular form, a rectangular form, etc.

Figure 8:
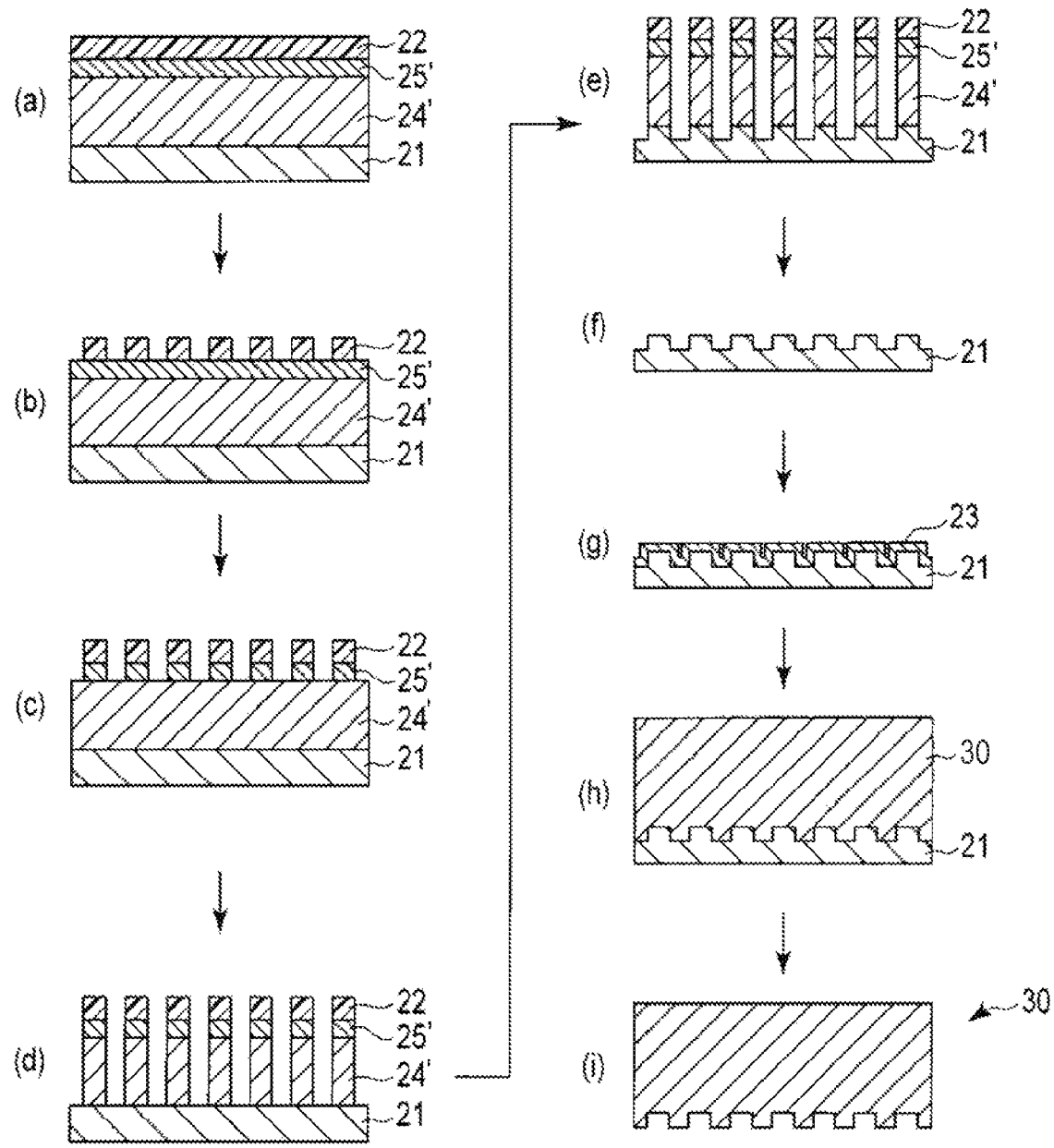
FIG. 8 is a view for explaining another example of the manufacturing method of the stamper.

FIG. 8 is a view for explaining another example of the manufacturing method of the stamper.

The protrusion-recess pattern is transferred to the resist layer using the obtained stamper. At this time, the stamper is substituted for a master plate, and the substitute stamper can be prepared.

For example, as illustrated in FIG. 8(a), the mask layer 24', the transfer layer 25', and the resist layer 22 are formed on the substrate 21. As illustrated in FIG. 8(b), the stamper 24 is imprinted to the resist layer 22, the resist layer 22 is patterned, and the resist pattern is formed.

As illustrated in FIG. 8(c), the transfer layer 25' is patterned through the resist pattern. As illustrated in FIG. 8(d), the mask layer 24' is patterned through the transfer layer 25'. As illustrated in FIG. 8(e), the substrate 21 is patterned through the mask layer 24', and the mask layer 24', the transfer layer 25', and the resist layer 22 are removed. As illustrated in FIG. 8(f), the substrate 21 having the protrusion-recess is formed. As illustrated in FIG. 8(g), the conductive layer (Ni thin film 23) is formed on the surface of the substrate 21, and an electroforming layer as a stamper 30 is formed by electroforming. Finally, the stamper 30 is obtained by separating from the substrate as illustrated in FIGS. 8(h) and 8(i).

In this case, given as examples are a method for obtaining a Ni stamper from a Ni stamper and a method for obtaining a Ni stamper from a resin stamper. Herein, a manufacturing method of a resin stamper is explained.

A resin stamper is manufactured by ejection molding. First, a nickel stamper is loaded in the ejection molding device, a resin solution material is flowed into the protrusion-recess pattern of the stamper, and an ejection molding is performed. As the resin solution material, cyclo-olefin polymer, polycarbonate, poly methyl methacrylate, etc. can be applied, and a material having a good stripping property with an imprint resist can be selected. After the ejection molding is performed, a resin stamper that has the protrusion-recess pattern is obtained by stripping a sample from the upper side of the Ni stamper.

Figure 9:
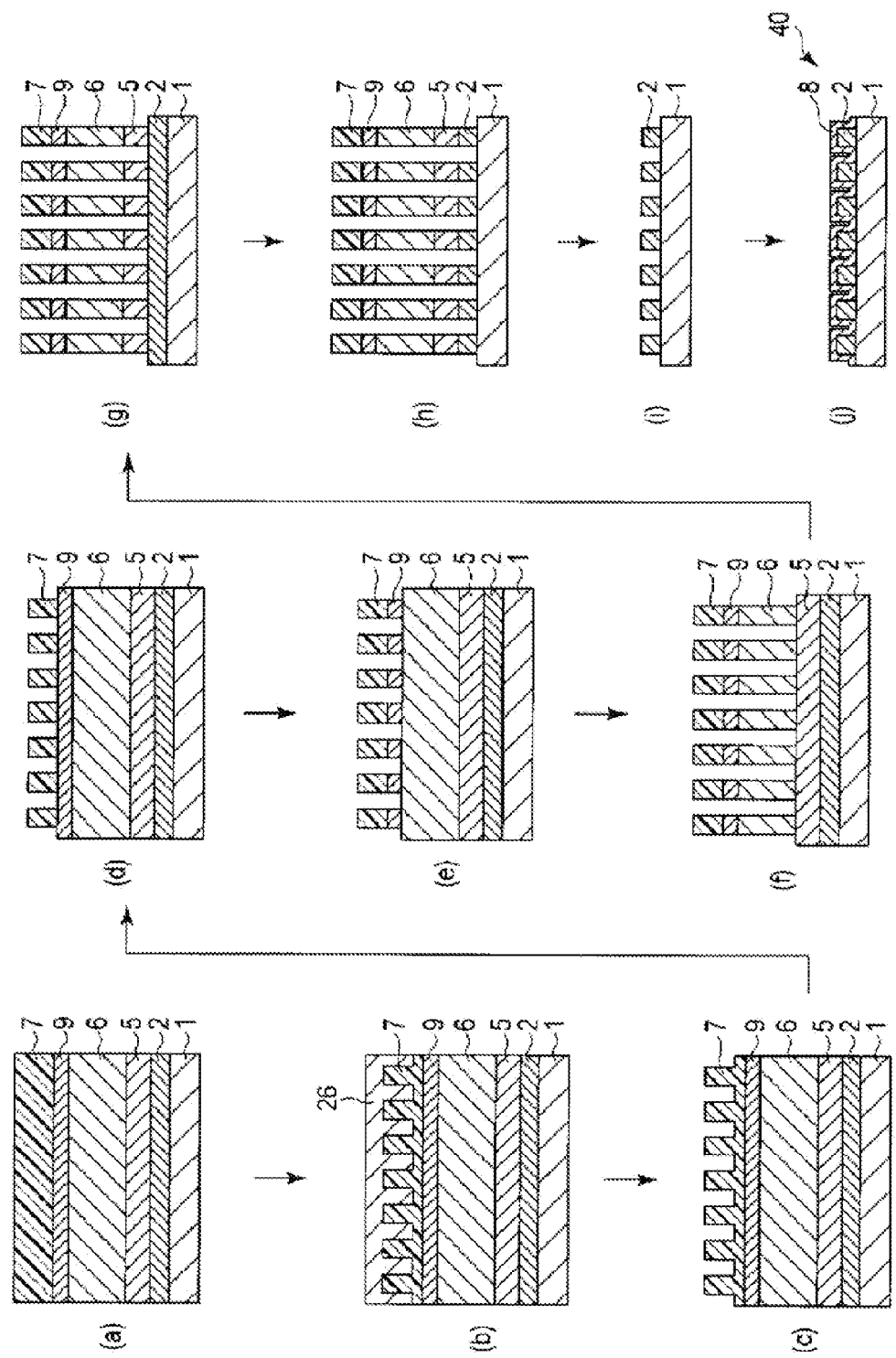
FIG. 9 is a view for further explaining other example of the manufacturing method of the magnetic recording medium according to the first embodiment.

FIG. 9 is a view for explaining another example of the manufacture method of the magnetic recording medium according to the first embodiment.

As illustrated in FIG. 9(a), a stack in which the magnetic recording layer 2, the alloyed release layer 5, the mask layer 6, the transfer layer 9, and an imprint resist layer 7 are laminated on the substrate 1 is prepared.

As illustrated in FIG. 9(b), the protrusion-recess pattern is transferred to the resist layer 7 by using a resin stamper 26.

It is possible to use resist materials including a thermoset resin or photopolymer for the resist, and for example, isobornyl acrylate, allyl methacrylate, dipropylene glycol diacrylate, etc. are applicable.

Such resist material is applied to the sample having the above-described magnetic recording layer and mask layer, and the resist layer is formed. Next, the resin stamper having the protrusion-recess pattern is imprinted to the resist layer. During the imprint, the resist is liquidized when the resin stamper is pressed to the resist, and the protrusion-recess pattern is formed. Herein, the resist layer in which the protrusion-recess pattern is formed is hardened by applying energy such as ultraviolet rays to the resist layer. In order to separate the resin stamper easily, a separation treatment using a silane coupling agent may be performed in advance to the resin stamper surface.

Because as illustrated in FIG. 9(c), the resist material remains as a residue on the recess part of the resist layer after the separation of the resin stamper, the surfaces of the transfer layer 9 and the mask layer 6 are exposed by removing the residue by etching as illustrated in FIG. 9(d) and FIG. 9(e). Because a polymer based resist material has normally low etching tolerance with respect to $O_2$ etchant, the residue can be easily removed by performing $O_2$ etching. When a non-organic material is contained, etchant can be arbitrarily changed such that the resist pattern remains. As described above, the protrusion-recess pattern can be provided to the resist layer by nanoimprint.

Mask Layer Patterning Step

Next, as illustrated in FIG. 9(f), the protrusion-recess pattern of the resist layer 7 is transferred to the mask layer 6.

In the process of the mask layer, various layer configurations and process methods can be realized by the combination of a mask layer material and an etching gas.

Similarly to the above-described case of the resist layer, it is preferred to apply a dry etching when a microfabrication is performed such that an etching in the thickness direction of the protrusion-recess pattern functions with respect to an etching in the width direction of the protrusion-recess pattern. Plasma used by a dry etching can bet generated by various methods, such as capacitive coupling, inductive coupling, electron cyclotron resonance, and multifrequency superposition combination. Also, parameters, such as process gas pressure, a gas flow rate, plasma input power, bias power, substrate temperature, chamber atmosphere, and an ultimate vacuum, can be set for the adjustment of the pattern size of the protrusion-recess pattern.

When a mask material is laminated in order to make the etching selectivity larger, an etching gas can be arbitrarily selected. As of the etching gas, given as examples are fluorine-containing gas, such as $CF_4$, $C_2F_6$, $C_3F_6$, $C_3F_8$, $C_5F_8$, $C_4F_8$, $ClF_3$, $CCl_3F_5$, $C_2ClF_5$, $CCBrF_3$, $CHF_3$, $NF_3$, and $CH_2F_2$, and chlorine-containing gas such as $Cl_2$, $BCl_3$, $CCl_4$, $SiCl_4$. In addition, various gases, such as $H_2$, $N_2$, $O_2$, $Br_2$, $HBr$, $NH_3$, $CO$, $C_2H_4$, $He$, $Ne$, $Ar$, $Kr$, and $Xe$, is applicable. Moreover, in order to adjust the etching rate and etching selectivity, it is also possible to use a mixed gas in which two or more types of these gases are mixed. In addition, a patterning by a wet etching is also possible and, in this case, it is good to select an etching solution that can secure the etching selectivity and can control the etching in the width direction. Similarly, a physical etching as an ion milling may be performed.

The mask layer may have various configurations depending on the combination with the resist layer. However, as described above, various configurations such as, for example, C/Si, Ta/Al, Al/Ni, Si/Cr, etc. from the substrate side can be applied.

Because the surface roughness of the release layer is reduced due to alloying, the increase in the roughness is suppressed even when the thickness of the mask layer is set larger. Therefore, the process margin is made larger by using a thick film mask, and also the variation in the pattern side can be reduced.

Alloyed Release Layer Patterning Step

Next, as illustrated in FIG. 9(g), the protrusion-recess pattern is transferred to the alloyed release layer 5.

Similarly to the case of the mask layer 6, the protrusion-recess pattern can be transferred to the alloyed release layer 5 by an etching. Because the upper mask layer may fail due to the resolving of the release layer and the deterioration in adherence when wet etching is performed, it is preferred to apply a dry etching for the protrusion-recess pattern transfer. In the patterning of the alloyed release layer and the magnetic recording layer, which will be described later, the layers may processed separately, but may be processed together.

When a dry etching is performed by using a chemically active gas, side surfaces of the release layer may chemically modified and its stripping property may lose. For this, the stripping property can be improved by modifying the surface again by exposing an active gas species. For example, when the surface of the release layer is oxidized due to an excessive exposure to an oxygen plasma, reduction reaction is promoted by exposing again to hydrogen plasma, so that it becomes possible to maintain the stripping property of the release layer. Also, the side surfaces of the release layer may be modified by washing using a solution. For example, a fluorine compound is removed by washing with water to the fluorine compound adhering to the side surfaces of the release layer after a fluorine plasma exposure, and it becomes possible to expose the release layer surface.

The alloyed release layer can be processed by various methods. For example, the boiling point of the fluorine compound generated by a dry etching is low, so that tungsten can be easily etched using a fluorine-containing gas. Similarly, aluminum can be easily etched by a chlorine-containing gas.

Also, similar to the mask layer, the release layer can be processed by performing an ion milling using a rare gas such as Ar, and in this case, a portion to the lower magnetic recording layer can be patterned at one time.

Magnetic Recording Patterning Step

Next, as illustrated in FIG. 9(h), the protrusion-recess pattern is transferred to the magnetic recording layer 2 that is a lower part of the alloyed release layer 5.

As a typical method for forming a magnetically isolated dot, given as example are the above-mentioned reactive ion etching, a milling method, etc. Specifically, a patterning is performed by the reactive ion etching in which CO and $NH_3$ is applied to an etching gas and by an ion milling using an inactive gas such as He, Ne, Ar, Xe, and Kr.

When a patterning of the magnetic recording layer is performed, it is desirable that the relationship of the etching rate ERmag of the magnetic recording layer to the etching rate ERmask of the mask layer satisfies ERmask≤ERmag. Namely, in order to obtain the desired thickness of the magnetic recording layer, the less recess of the mask layer caused by the etching, the more favorable.

When the protrusion-recess pattern is transferred to the magnetic recording layer by an ion milling, it is necessary to control a so-called re-deposition component, which is a byproduct that scatters toward a mask side wall along with processing. The re-deposition component adheres to the periphery of the protrusion pattern mask, so the size of the protrusion pattern is enlarged and the recess part is embedded. Therefore, in order to obtain the separated pattern of the magnetic recording layer, it is preferred to minimize the deposition component to the extent possible. Also, when the side surfaces of the release layer is covered by the re-deposition component generated during the etching of the magnetic recording layer, which is the lower part of the release layer, the release layer is not exposed to a stripping solution, and the stripping property is degraded. Therefore, it is preferred that there are few re-deposition components as mentioned above.

In the ion milling to the magnetic recording layer, a re-deposition component onto the side wall can be lessened by changing an incident angle of ion. In this case, although the optimal incident angle changes depending on the height of the mask, it is also possible to suppress the re-deposition material when the incident angle is in the range of 20°-70°. Moreover, the incident angle may be changed suitably during a milling.

Stripping Step

Then, as illustrated in FIG. 9(i), the magnetic recording layer 2 having the protrusion-recess pattern is obtained by removing the mask pattern on the magnetic recording layer 2, i.e., removing the alloyed release layer 5 together with a lamination of the alloyed release layer 5, the mask layer 6, the transfer layer 9, and the imprint resist layer 7.

As described above, the under layer and the metal release layer are alloyed to be a single layer, and the upper mask is removed from the upper side of the magnetic recording layer by resolving the layer. The dissolution of the release layer is desirably performed by a wet method using an etching solution. When the release layer is chemically removed by the dry etching as described above, the particles adhering on the mask layer remain as a pattern, and this eventually leads to degrade the surface property of the medium. When the release layer is dissolved by a wet etching, because the mask layer and the particles are lifted off and they are completely removed from the medium surface, the degradation of the surface property of the medium can be relieved.

Because the alloyed release layer includes a metal material that can be dissolved with acid or an alkaline solution as described above, an etching solution that can dissolve this can be appropriately selected. In an acid stripping solution, chloride, given as examples are hydrochloric acid, phosphoric acid, nitric acid, boric acid, perchloric acid, hydrobromic acid, carboxylic acid, sulfonic acid, hydrogen peroxide water, etc.

In an alkali stripping liquid, given as examples are sodium hydroxide solution, potassium hydroxide solution, calcium hydroxide solution, barium hydroxide solution, magnesium hydroxide solution, ammonium hydroxide solution, hydrazine, tetramethylammonium hydroxide, tetrapropylammonium hydrooxide, phenyltrimethylammonium hydroxide, etc. In addition, a buffer solution for adjusting the pH of a solution may be added suitably.

When the release layer is dissolved by a wet etching, it is desirable that the dissolution rate of the magnetic recording layer and the substrate is sufficiently smaller than the dissolution rate of the release layer.

In the above-described alloyed release layer, the density of the net metal release layer material is decreased when the under layer material is spread into the metal release layer. Therefore, the stripping rate of the alloyed release layer is increased and the stripping property of the mask layer is improved.

Protective Layer Formation Step

Finally as shown in FIG. 9(j) the magnetic recording medium 40 on which the protrusion-recess pattern is provided can be obtained by forming a carbon containing protective layer 8 and a fluorine containing lubricant film on the magnetic recording layer 2 pattern having the protrusions and recesses.

A DLC film containing a large amount of $sp^3$ combined carbon is suitable for the carbon protecting layer. Moreover, a film thickness thereof is preferably 2 nm or more to maintain a covering property and the film thickness is preferably 10 nm or less to maintain a signal S/N. Moreover, as a lubricant, perfluorinated polyether, fluoroalcohol, fluorocarboxylic acid, etc. can be used.

Figure 10:
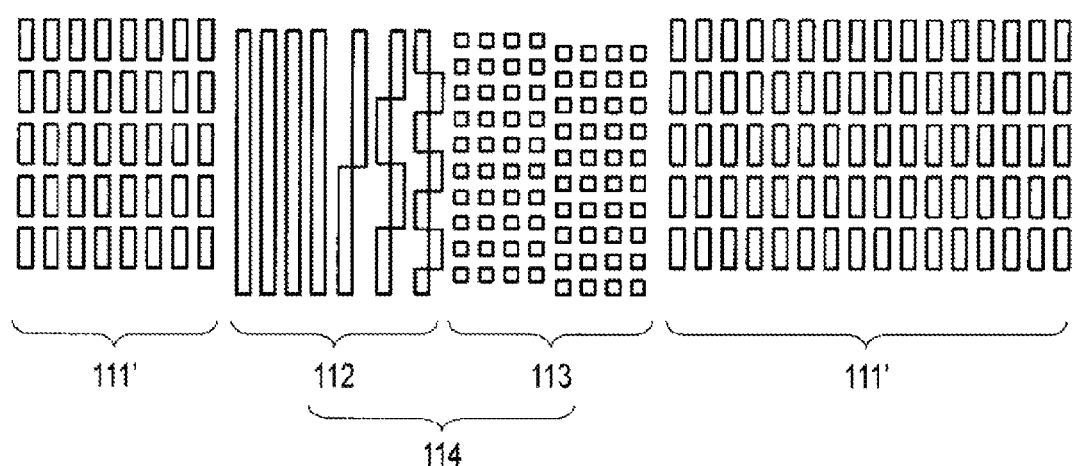
FIG. 10 is a view illustrating one example of a recording bit pattern with respect to a circumference direction of the magnetic recording medium.

FIG. 10 is a view illustrating one example of a recording bit pattern with respect to a circumferential direction of the magnetic recording medium.

Figure 11:
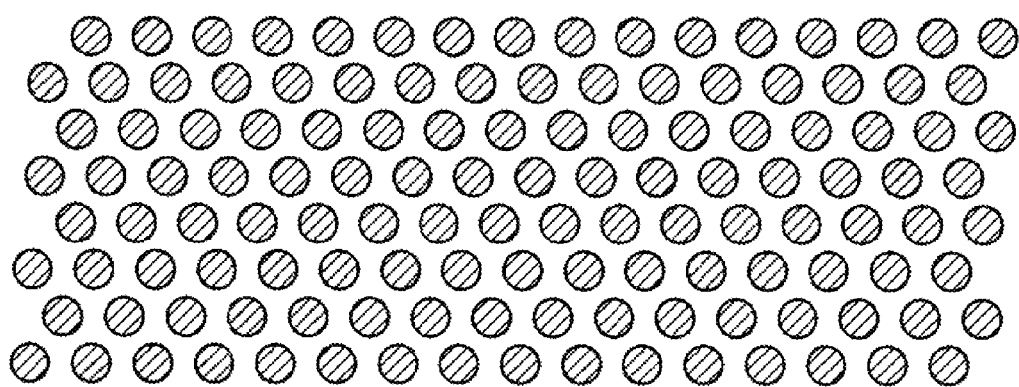
FIG. 11 is a view illustrating another example of the recording bit pattern of the magnetic recording medium.

A protrusion pattern of the magnetic recording layer is roughly classified into a record bit region 111', and a so-called servo region 114 formed with a preamble address pattern 112 and a burst pattern 113 as illustrated in the figure. The record bit region 111' is a region where data equivalent to 1 and 0 of digital signals is recorded. The preamble address pattern 112 that eventually becomes a positioning signal of the magnetic head. And the protrusion pattern can be formed as an in-plane pattern. Moreover, the pattern of the servo region 114, which is illustrated in the figure, may not be a rectangular shape, and the entire servo region pattern may be replaced with a dot shape, for example. Furthermore, as illustrated in FIG. 11, in addition to the servo pattern, it is also possible to configure the entire data region from a dot pattern. One-bit information may be configured with one magnetic dot or plural magnetic dots.

Figure 12:
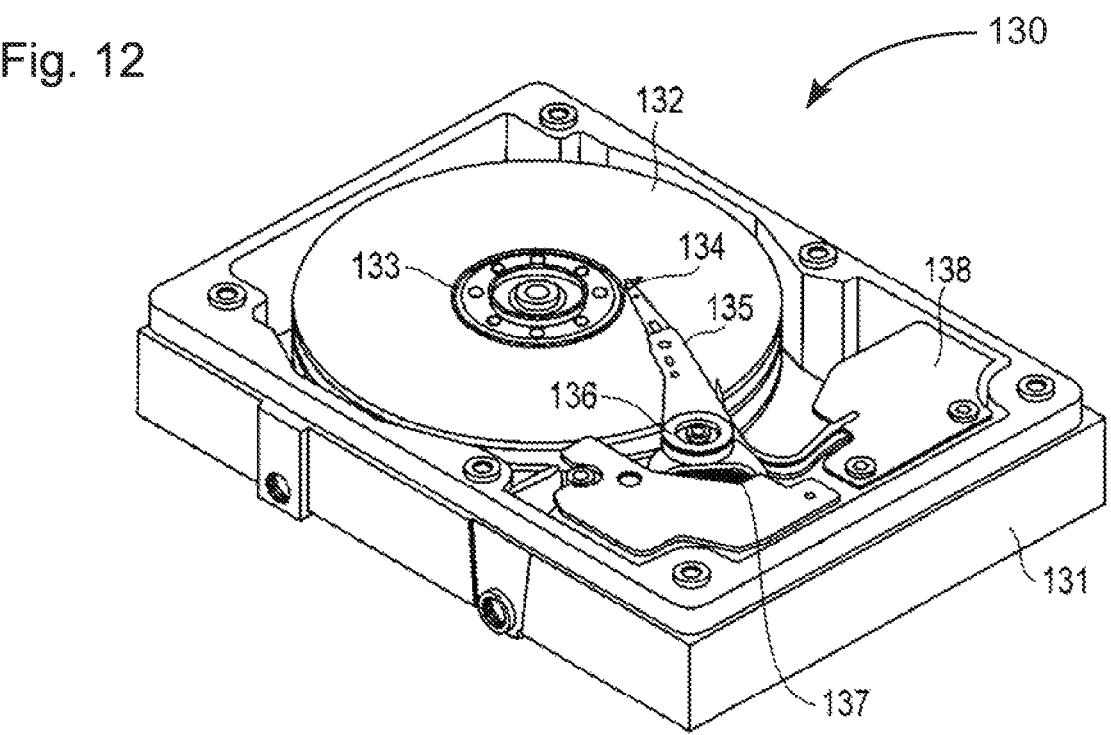
FIG. 12 is a partially-exploded perspective view of one example of a magnetic recording-reproducing device to which the magnetic recording medium according to the embodiments is applicable.

FIG. 12 is a partially-cut away perspective view of one example of a magnetic recording-reproducing device to which the magnetic recording medium according to the embodiment is applicable.

As illustrated in FIG. 12, a magnetic recording-reproducing device 130 has a base 131 having an open-topped rectangular box shape and a top cover (not illustrated) that is screwed on the base by plural screws so as to close a top opening of the base.

In the base 131, a perpendicular magnetic recording medium 132 manufactured by the method according to the embodiment, a spindle motor 133 functioning as a driving means that supports and rotates the perpendicular magnetic recording medium 132, a magnetic head 134 that records magnetic signals to and reproduces magnetic signals from the perpendicular magnetic recording medium 132, a head actuator 135 that has a suspension having the magnetic head mounted on its tip end and supports movably the magnetic head 134 with respect to the perpendicular magnetic recording medium 132, a rotation shaft 136 that rotationally supports the head actuator 135, a voice coil motor 137 that rotates and positions the head actuator 135 via the rotation shaft 136, and a head amplifier circuit 138 are contained.

EXAMPLES

Hereinafter, the embodiment is explained in detail showing examples.

Example 1

First, a manufacturing method of forming the protrusion-recess pattern on the resist layer by electron beam lithography and then transferring to the magnetic recording layer is explained.

A donut substrate having a diameter of 2.5 inch was used as a substrate, and a magnetic recording layer is formed on the substrate by a DC sputtering method. A process gas was Ar, a gas pressure was set at 0.7 Pa, a gas flow rate was set at 35 sccm, and an input power was set at 500 W. From the substrate side, a NiTa under layer having the thickness of 10 nm/a Pd under layer having the thickness of 4 nm/a Ru under layer having the thickness of 20 nm/a CoPt recording layer having the thickness of 5 nm were subsequently formed, and a Pd protective layer having the thickness of 3 nm was formed at last. Therefore, the magnetic recording layer was obtained.

Then, a under layer was formed on the magnetic recording layer for roughness reduction of the release layer. Herein, a Pd film was selected and was formed to have a thickness of 1.5 nm by a DC sputtering method. Also herein, in order to intentionally make the roughness larger, a pressure of the process gas was increased to 4.0 Pa and the film formation was performed, and the Pd film having the surface roughness of 0.32 nm was obtained. Then, a metal release layer was formed on the under layer. Herein, W was selected for an acid stripping, and an alloyed release layer was obtained from a lamination with the under layer. Film formation of W was performed by a DC sputtering method and a thickness thereof was 4.5 nm. A film formation pressure was set at 0.7 Pa, and the reduction in the roughness was intended by a low pressure sputtering method. Herein, the Pd release layer and the W metal release layer are alloyed by laminating them, and an alloyed release layer having a component incline of Pd/Pd—W/W from the substrate side is formed. In addition to the content of the present example, it is possible to perform a thermal annealing to promote an alloying of the under layer and the metal release layer. Specifically, a current is turned on an electrically heating wire heater provided in a film formation chamber and heating of the substrate is performed in a vacuum atmosphere, and then annealing can be performed. As described above, the alloyed release layer having a total film thickness of 6 nm was obtained. It was confirmed that the surface roughness of the alloyed release layer was reduced to 0.27 nm by the under layer.

Next, a mask layer was formed on the release layer. Herein, two layers of masks were used to highly precisely transfer the protrusion-recess pattern of the resist layer. A substrate side one of the layers was named as a first mask layer and was made of C having the thickness of 30 nm. As an upper transfer layer, a layer made of Si having the thickness of 5 nm was applied. In formation of the mask layers, a facing target DC sputtering device was used. An Ar gas flow rate was set at 35 sccm, an Ar gas pressure was set at 0.7 Pa, an input power was set at 500 W, and a sputtering film formation was performed.

Next, a main chain scission type electron beam positive resist for patterning was formed. For the electron beam resist, ZEP-520A (Zeon Corporation) was used. Anisole was used as a solvent, and ZEP-520A was made to a solution in which ZEP-520A was dissolved at a weight ratio of ZEP-520A: anisole=1:3. Then, the solution was dripped onto the substrate, and a spin coating was performed at a rotation rate of 2500 rpm such that the resist had the thickness of 30 nm. The sample was held for 150 seconds on a vacuum hot plate heated to 180° C., and the electron resist was hardened by pre-baking.

Next, an electron beam drawing device was used and a pattern drawing to the electron beam resist was performed. The electron beam drawing device has a ZrO thermal electro field emission electron source and is equipped with beam having an acceleration voltage of 100 kV and a beam diameter of 2 nm. The electron beam drawing device is a so-called x-θ type drawing device that has signals for forming a drawing pattern and is equipped with an uniaxial moving mechanism and a concentric circle rotation mechanism of the sample stage. For a drawing of the sample, signals for deviating electron beams are synchronized and also the stage is moved with respect to a radius direction. Herein, a drawing line speed was set at 0.15/sec, a beam current value was set at 13 nA, and a moving amount toward the radius direction was set at 5 nm. On the electron line resist, latent images having a pitch of 20 nm of a dot/space pattern and a line/space pattern were formed.

By developing this, protrusion-recess patterns of a diameter dot of 10 nm/space of 10 nm and width line of 10 nm/a width space of 10 nm can be resolved. As a developing liquid, an organic developing liquid having a component of 100% of n-amyl acetate was used, and the sample was immersed in the liquid for 20 seconds. As described above, developing of the electron beam resist was performed.

Then, the sample was immersed in isopropyl alcohol for 20 seconds and is rinsed, and the sample surface was dried by a direct blow of $N_2$.

The protrusion-recess pattern transfer to the mask layer was performed by a dry etching. For the dry etching, an inductively-coupled type plasma etching using a $CF_4$ gas and an $O_2$ gas was applied. First, in order to transfer the protrusion-recess pattern to a Si transfer layer that is below the resist, a $CF_4$ gas pressure was set at 0.1 Pa, a gas flow rate was set at 20 sccm, an input power was set at 100 W, and a bias power was set at 10 W, and an etching was performed for 40 seconds. As a result, the protrusion-recess pattern of the resist was transferred. Then, in order to etch a C mask layer, an $O_2$ gas was used, a gas pressure was set at 0.1 Pa, a gas flow rate was set at 20 sccm, an input power was set at 100 W, and a bias power was set at 20 W, and an etching was performed for 65 seconds. As a result, the protrusion-recess pattern was transferred.

Next, the protrusion-recess pattern was transferred to the release layer and the magnetic recording layer. As described above, in the protrusion-recess pattern transfer to the release layer and the magnetic recording layer, the layers may be separately patterned in different etching steps, but may also be patterned in the same step. Here, a milling method by Ar ion was applied. As Ar ion acceleration voltage was set at 300V, a gas flow rate was set at 3 sccm, a process pressure was set at 0.1 Pa, an incident angle of an ionic species with respect to the substrate surface was set at 90° (vertical incidence), and a milling was performed for 110 seconds. As a result, the protrusion-recess pattern was transferred to the Pd/W alloyed release layer having a thickness of 6 nm and the CoPt recording layer having a thickness of 5 nm.

Then, in order to strip a mask pattern, a wet stripping was performed. As described above, herein a W alloy layer with which an acid stripping can be performed is used as the release layer, so that a wet stripping was performed using hydrogen peroxide water. Hydrogen peroxide water was prepared such that a weight percent concentration thereof becomes 1%, and the sample was immersed for 3 minutes. Then, the sample was washed for 5 minutes, and the medium surface was cleaned. The mask layer and the release layer were removed from the upper side of the magnetic-recording layer.

Finally, after a DLC film having a thickness of 2 nm is formed, a magnetic recording medium having the protrusion-recess pattern was obtained by forming a purfluoropolyethers containing lubricant film having a thickness of 1.5 nm.

A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 2

In the example 2, a micro phase separation structure was formed on the resist layer using a self-assembling film instead of ZEP-520A, an etching was performed based on the micro phase separation pattern, and further a Si/C film was inserted between the self-assembling film and the mask layer. Other than above-described things, the example 2 is the same as the example 1.

First, a carbon film, which is for transferring the self-assembling pattern onto the Si transfer layer, having a thickness of 3 nm was formed. The film formation was performed herein by a DC sputtering method, and an Ar gas pressure was set at 0.7 Pa and an input power was set at 500 W.

Next, a block copolymer solution was applied onto a carbon film. As the block copolymer solution, a solution that a block copolymer made of polystyrene and polydimethalsiloxane is dissolved in an applying solvent was used. The molecular weights of polystyrene and polydimethylsiloxane were respectively 11700 and 2900. A micro phase separation structure having a pattern pitch of 20 nm can be obtained with this composition. As the solvent, propyleneglycolmonomethylether acetate was used, and a polymer solution was prepared such that a weight percent concentration is 1.5%.

This solution was dripped onto the carbon film mask, spin coating was performed at a rotation rate of 5000 rpm, and a self-assembling film having a thickness of 18 nm, which eventually becomes a monolayer self-assembling film, was formed. The monolayer self-assembling film means that the film has no class structure in the same plane of the medium and a micro phase separation pattern made of a backbone of polystyrene and island-shaped polydimethylsiloxane is formed in one layer.

Furthermore, a thermal annealing was performed in order to separate the backbone of polystyrene and the island-shaped polydimethylsiloxane dot pattern in micro phases inside the self-assembling film. In the thermal annealing, a vacuum heating furnace is used, and an annealing was performed under a reduced pressure atmosphere, which is a furnace pressure of 0.2 Pa, at 170° C. for 12 hours. Therefore, a micro phase separation structure made of dots each having a pitch of 20 nm in the self-assembling film was formed.

Then, the protrusion-recess pattern was formed by etching based on the phase separation pattern. As the etching, an inductively coupled plasma type reactive ion etching was performed. A process gas pressure was set at 0.1 Pa and a gas flow rate was set at 5 sccm.

First, in order to remove the polydimethylsiloxane on the surface of the self-assembling film, an etching was performed using a $CF_4$ gas as an etchant at an antenna power of 50 W at a bias power of 5 W for 7 seconds. Next, in order to transfer the protrusion-recess pattern onto the backbone of polystyrene and the C film under the self-assembling film, an etching was performed using an $O_2$ gas as an etchant at an antenna power of 100 W at a bias power of 5 W for 110 seconds. Because the $O_2$ etchant used for removal of polystyrene etches the C film, which is a lower layer, the Si transfer layer functions as a stopper layer and etching stops. Furthermore, the protrusion-recess pattern of the self-assembling film was transferred to the mask layer by etching the Si transfer layer and the C mask layer, which are the lower layers, by a plasma etching using a $CF_4$ etchant and an $O_2$ etchant the same as the example 1.

After that, the pattern transfer and the stripping step were performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 3

In the example 3, a layer formed of metal particles and macromolecule binders was used for the resist layer, and the protrusion-recess pattern was formed by using the metal particles as a resist protrusion-recess pattern. Other than those, the example 3 is the same as the example 2.

First, an application solution for forming a metal particle mask was prepared. This application solution is made from a mixed solution of a dispersion liquid of the metal particles and the macromolecule binder.

For the metal particles, Au having a particle diameter of 20 nm was used. Moreover, lactic acid ethyl was used as a solvent of the dispersion liquid, and solution adjustment was performed so that a mass weight percent concentration thereof becomes 1%. Furthermore, in order to suppress the formation of secondary particles caused by aggregation of Au particles, a polycarboxylicacidaminesalt content dispersion agent was added to a dispersion liquid so that a mass weight percent concentration thereof becomes 0.001%, and monodispersion of the Au particles was promoted.

Then, an application solution was prepared by adding a macromolecule binder to an Au dispersion liquid. This macromolecule binder serves to improve a coating property of a metal particle solution by mixture with the dispersing agent. Moreover, the mixed system made of the metal particles/the macromolecule binder shows an aspect similar to a microphase separation pattern of the self-assembling film in the above-mentioned example 2. Specifically, the macromolecule binder corresponds to the backbone of polystyrene, and the metal particles correspond to the island-shaped polydimethylsiloxane dots.

Next, a metal particle resist layer was formed on the C film. An appropriate amount of the prepared metal particle application solution was dripped onto the C film, and a spin coat was performed at a rotation rate of 3000 rpm. Thereby, a monolayer metal particle layer was obtained. Here, monolayer is synonymous with the one used for the explanation of the above-mentioned self-assembling film and does not have a layered structure in the same plane of the medium, and means that a composite layer of the backbone of the macromolecule binder and the island-shaped Au metal particles is a single layer. A baking was performed in an $N_2$ atmosphere oven at 150° C. for 30 minutes after the application, and a metal particle mask layer was formed by hardening the macromolecule binder.

A dry etching was performed to this mask layer, and the protrusion-recess pattern was formed. In this example, the metal particles are used as a mask, so the macromolecule binder filled among the metal particles is removed. In the dry etching, an $O_2$ gas was used as an etchant, a process gas pressure was set at 0.1 Pa, a gas flow rate was set at 5 sccm, an antenna power was set at 100 W, a bias power was set at 10 W, and the etching was performed for 24 seconds. Therefore, the protrusion-recess pattern was transferred to the macromolecule binder and the lower C film.

After that, in the same way as the example 2, the pattern transfer from the Si transfer layer to the magnetic recording layer and the stripping step were performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 4

In the example 4, a resist for nanoimprint is used as a resist layer, and the protrusion-recess pattern formation is performed by using a stamper for nanoimprint. Other than those, the example 4 is the same as the example 1.

First, a master plate was prepared to prepare a nanoimprint stamper. A generally-used 6-inch Si wafer was used as a substrate, and in the same way as the example 1, a carbon mask layer having a thickness of 30 nm/a Si transfer layer having a thickness of 6 nm were formed from the substrate side. Next, after the formation of an electron-beam resist layer, electron beam drawing and developing were performed and a 20 nm pitch dot pattern was formed.

A stamper for nanoimprint was prepared by using this master plate. First, in order to perform a process that makes the protrusion-recess pattern conductive, a Ni film was formed by a DC sputtering method. The protrusion-recess pattern was uniformly covered with an Ni conductive film having a thickness of 5 nm under a condition where an ultimate vacuum was set at $8.0 \times 10^{-4}$ Pa, an Ar gas pressure was set at 1.0 Pa, an DC input power was set at 200 W. As a conductive film formation method, an evaporation method may be used in addition to a sputtering method. Also, a Ni—P alloy and a Ni—B alloy formed by an electroless plating may be substitutes. Also, in order to perform a stripping of the stamper easily, a surface may be oxidized after the formation of conductive layer.

Then, a Ni film along the protrusion-recess pattern was formed by an electroforming method. The high concentration sulfamic acid nickel plating liquid (NS-169) (made by Showa Chemistry Co. Ltd) was used as an electroforming liquid. A Ni stamper having a thickness of 300 μm was prepared under an electroforming condition that is sulfamic acid nickel: 600 g/L; boric acid: 40 g/L; sodium lauryl sulfate surfactant: 0.15 g/L; liquid temperature: 55° C.; pH: 3.8-4.0; flowing current density: 20 A/dm$^2$. A stamper for nanoimprint having the protrusion-recess pattern can be obtained by removing the Ni stamper from the master plate. When residue and particles remain on the protrusion-recess of the removed stamper, the residue and particles can be removed and the stamper can be washed by performing an etching to the protrusion-recess pattern as necessary. At the end, the electroformed Ni board was punched into a disk shape having a diameter of 2.5 inch, and the Ni stamper was obtained.

An ejection molding process was performed to the Ni stamper, and a resin stamper was reproduced. As a resin material, cyclo-olefin polymer produced by Zeon Corporation (ZEONOR 1060R) was used.

The protrusion-recess pattern was formed to the resist layer by using a resin stamper obtained as mentioned above. First, the spin coating of an ultraviolet hardening resist was performed onto the medium sample such that a thickness thereof becomes 40 nm, and this was used as the resist layer. Then, the imprint of the above-mentioned resin stamper was performed to the resist layer, and the resist layer was hardened by irradiation with ultraviolet rays (irradiation of ultraviolet rays under a state where an ultraviolet hardening resin layer is pressed by the resin stamper). A desired 20 nm pitch dot pattern was obtained by separating the hardened resist layer from the resin stamper.

Because a resist residue, which is generated by the imprint, remains in the recess part of the protrusion-recess pattern of the sample, this was removed by an etching. The residue removal of the resist was performed by a plasma etching using an O$_2$ etchant. An O$_2$ gas flow rate was set at 5 sccm, a pressure was set at 0.1 Pa, input power was set at 100 W, a bias power was set at 10 W, and the etching was performed for 8 seconds. Thereby, the resist residue was removed.

After that, in the same way as the example 1, the pattern transfer from the Si transfer layer to the magnetic recording layer and the stripping step were performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 5

In the example 5, Si was used as the under layer material. Other than this, the example 5 is the same as the example 1.

A Si under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.32 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 6

In the example 6, Ti was used as the under layer material. Other than this, the example 6 is the same as the example 1.

A Ti under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.0 nm. At this time, a value of a surface roughness was 0.35 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 7

In the example 7, V was used as the under layer material. Other than this, the example 7 is the same as the example 1.

A V under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.29 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 8

In the example 8, Zn was used as the under layer material. Other than this, the example 8 is the same as the example 1.

A Zn under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.4 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 9

In the example 9, Ni was used as the under layer material. Other than this, the example 9 is the same as the example 1.

A Ni under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.6 nm. At this time, a value of a surface roughness was 0.32 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 10

In the example 10, Mo was used as the under layer material. Other than this, the example 10 is the same as the example 1.

A Mo under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 2 nm. At this time, a value of a surface roughness was 0.25 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 11

In the example 11, Cr was used as the under layer material. Other than this, the example 11 is the same as the example 1.

A Cr under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.37 nm. At this time, a value of a surface roughness was 0.28 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 12

In the example 12, Cu was used as the under layer material. Other than this, the example 12 is the same as the example 1.

A Cu under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.4 nm. At this time, a value of a surface roughness was 0.33 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 13

In the example 13, Zr was used as the under layer material. Other than this, the example 13 is the same as the example 1.

A Zr under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 0.95 nm. At this time, a value of a surface roughness was 0.26 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 14

In the example 14, Nb was used as the under layer material. Other than this, the example 14 is the same as the example 1.

A Nb under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.26 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 15

In the example 15, Hf was used as the under layer material. Other than this, the example 15 is the same as the example 1.

A Hf under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.0 nm. At this time, a value of a surface roughness was 0.3 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 16

In the example 16, Ta was used as the under layer material. Other than this, the example 16 is the same as the example 1.

A Ta under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 0.7 nm. At this time, a value of a surface roughness was 0.28 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 17

In the example 17, Ag was used as the under layer material. Other than this, the example 17 is the same as the example 1.

An Ag under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.4 nm. At this time, a value of a surface roughness was 0.37 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 18

In the example 18, Au was used as the under layer material. Other than this, the example 5 is the same as the example 1.

An Au under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.29 nm.

After that, in the same way as the example 1, the W metal release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 19

From the example 19 through an example 33, descriptions are given regarding examples of cases where a film formation order of various under layers and a W metal release layer are changed. The present example is an example where a W metal release layer and a Pd under layer are used, and is the same as the example 1 except for that a film formation order of them is changed. Note, a surface roughness of an alloyed release layer was 0.27 nm.

After that, in the same way as the example 1, a W/Pd alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 20

The example 20 is an example where a W metal release layer and a Si under layer are used, and is the same as the example 5 except for that a film formation order of them is changed. Note, a surface roughness of an alloyed release layer was 0.34 nm.

After that, in the same way as the example 5, a W/Si alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 21

The example 21 is an example where a W metal release layer and a Ti under layer are used, and is the same as the example 6 except for that a film formation order of them is changed. Note, a surface roughness of an alloyed release layer was 0.32 nm.

After that, in the same way as the example 6, a W/Ti alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 22

The example 22 is an example where a W metal release layer and a V under layer are used, and is the same as the example 7 except for that a film formation order of them is changed. Note, a surface roughness of the alloyed release layer was 0.30 nm.

After that, in the same way as the example 7, a WN alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 23

The example 23 is an example where a W metal release layer and a Zn under layer are used, and is the same as the example 8 except for that a film formation order of them is changed. Note, a surface roughness of the alloyed release layer was 0.42 nm.

After that, in the same way as the example 8, a W/Zn alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 24

The example 24 is an example where a W metal release layer and a Ni under layer are used, and is the same as the example 9 except for that a film formation order of them is changed. Note, a surface roughness of the alloyed release layer was 0.30 nm.

After that, in the same way as the example 9, a W/Ni alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 25

The example 25 is an example where a W metal release layer and a Mo under layer are used, and is the same as the example 10 except for that a film formation order of them is changed. Note, a surface roughness of the alloyed release layer was 0.22 nm.

After that, in the same way as the example 10, a W/Mo alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 26

The example 26 is an example where a W metal release layer and a Cr under layer are used, and is the same as the example 11 except for that a film formation order of them is changed. Note, a surface roughness of the alloyed release layer was 0.31 nm.

After that, in the same way as the example 11, a W/Cr alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 27

The example 27 is an example where a W metal release layer and a Cu under layer are used, and is the same as the example 12 except for that a film formation order of them is changed. Note, a surface roughness of the alloyed release layer was 0.31 nm.

After that, in the same way as the example 12, a W/Cu alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 28

The example 28 is an example where a W metal release layer and a Zr under layer are used, and is the same as the example 13 except for that a film formation order of them is changed. Note, a surface roughness of the alloyed release layer was 0.28 nm.

After that, in the same way as the example 13, a W/Zr alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 29

The example 29 is an example where a W metal release layer and a Nb under layer are used, and is the same as the example 14 except for that a film formation order of them is changed. Note, a surface roughness of the alloyed release layer was 0.24 nm.

After that, in the same way as the example 14, a W/Nb alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 30

The example 30 is an example where a W metal release layer and a Hf under layer are used, and is the same as the example 15 except for that a film formation order of them is changed. Note, a surface roughness of the alloyed release layer was 0.34 nm.

After that, in the same way as the example 15, a W/Hf alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 31

The example 31 is an example where a W metal release layer and a Ta under layer are used, and is the same as the example 16 except for that a film formation order of them is changed. Note, a surface roughness of an alloyed release layer was 0.27 nm.

After that, in the same way as the example 16, a W/Ta alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 32

The example 32 is an example where a W metal release layer and a Ag under layer are used, and is the same as the example 17 except for that a film formation order of them is changed. Note, a surface roughness of the alloyed release layer was 0.36 nm.

After that, in the same way as the example 17, a W/Ag alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 33

The example 33 is an example where a W metal release layer and a Au under layer are used, and is the same as the example 18 except for that a film formation order of them is changed. Note, a surface roughness of the alloyed release layer was 0.31 nm.

After that, in the same way as the example 18, a W/Au alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 34

The example 34 is an example of a case where a thick W metal release layer is provided, and a description of a case where Pd, which is a typical material for an under layer, is used is given. In the same way as the example 1, a Pd under layer and a W metal release layer were formed by a DC sputtering method.

The Pd under layer was formed to have a film thickness of 1.5 nm. At this time, a surface roughness was 0.32 nm. Then, the W metal release layer was formed to have a thickness of 8.5 nm. A surface roughness after alloying was 0.3 nm, and it was confirmed that roughness reduction effect was decreased.

After that, in the same way as the example 1, the protrusion-recess pattern of the resist layer was transferred to the magnetic recording layer, the stripping step was performed, and a magnetic recording medium having the protrusion-recess pattern was obtained. The pattern of the manufactured magnetic recording medium was observed, and it was recognized that the W metal release layer was stripped favorably. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 35

The example 35 is an example of a case where a thin under layer is provided, and a description of a case where Pd, which is a typical material for an under layer, is used is given. In the same way as the example 1, a Pd under layer and a W metal release layer were formed by a DC sputtering method. The Pd under layer was formed to have a film thickness of 0.3 nm. At this time, a surface roughness was 0.23 nm. (Given this example acceptable surface roughnesses for the alloyed release layer would be <0.30 nm, or <0.27 nm, or <0.25 nm, or approximately 0.23 nm or less with a range of tolerance up to 0.30 nm or less.) Then, the W metal release layer was formed to have a thickness of 4.5 nm. A surface roughness after alloying was 0.29 nm, and it was confirmed that a surface roughness was increased.

After that, in the same way as the example 1, the protrusion-recess pattern of the resist layer was transferred to the magnetic recording layer, the stripping step was performed, and a magnetic recording medium having the protrusion-recess pattern was obtained. The pattern of the manufactured magnetic recording medium was observed, and it was recognized that the W metal release layer was stripped favorably. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 36

The example 36 is an example of a case where a thick under layer is provided, and a description of a case where Pd, which is a typical material, is used is given. In the same way as the example 1, a Pd under layer was formed by a DC sputtering method. A film thickness was set at 5.5 nm, and at this time, a surface roughness was 0.4 nm. Then, the W metal release layer was formed to have a thickness of 4.5 nm in the same way as the example 1. A surface roughness after alloying of them was measured and the surface roughness was 0.37 nm, and it was confirmed that surface roughness reduction effect was decreased.

After that, in the same way as the example 1, a Pd/W alloyed release layer was formed, the protrusion-recess pattern of the resist layer was transferred to the magnetic recording layer, the stripping step was performed, and a magnetic recording medium having the protrusion-recess pattern was obtained. The pattern of the manufactured magnetic recording medium was observed. The W metal release layer was stripped, but a residue of approximately 0.5 nm remains in a lower layer portion of the thick film Pd. It was recognized that a patterned protective film was formed. A head flying height with respect to the obtained magnetic recording medium was measured by a glide height tester, and a flying property evaluation was performed. A result thereof passed a flying height of 10 nm, which is a necessary standard for performing a reading-writing evaluation of the medium. However, because contact frequencies to the medium surface during the head moving increase, the evaluations were A.

Example 37

The example 37 through example 51 are examples of cases where Al, which is dissolvable in alkali, is used for a metal release layer. In the example 37, Pd is used as an under layer material, and Al is used for a metal release layer. The protrusion-recess pattern formation of the resist layer and the transfer to the mask layer are the same as the example 1.

A Pd film was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.5 nm. At this time, a value of a surface roughness was 0.32 nm. Similarly, an Al film having a thickness of 3.5 nm was formed by a DC sputtering method. At this time, a value of a surface roughness was 0.29 nm.

The protrusion-recess patter transfer to a Pd/Al alloyed release layer and the magnetic recording layer was performed by a milling method using Ar ion. As Ar ion acceleration voltage was set at 300V, a gas flow rate was set at 3 sccm, a process pressure was set at 0.1 Pa, an incident angle of an ionic species with respect to the substrate surface was set at 90° (vertical incidence), and a milling was performed for 120 seconds. As a result, the protrusion-recess pattern was transferred to the Pd/Al alloyed release layer having a thickness of 5 nm and the CoPt recording layer having a thickness of 5 nm.

The release layer was dissolved by using an alkali solution, and an upper part of the mask layer was removed from the upper side of the magnetic recording layer. Sodium hydroxide solution was used for an alkali solution and was diluted by pure water such that a weight percent concentration thereof becomes 1%, and a sample was immersed for 3 minutes. Then, the sample was washed for 5 minutes, and the medium surface was cleaned. The mask layer and the release layer were removed from the upper side of the magnetic recording layer.

As described above, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 38

In the example 38, Si was used as an under layer material. Other than this, the example 38 is the same as the example 37. Note, a patterning to the resist layer and a patterning to the mask layer are the same as the example 1.

A Si under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.32 nm.

After that, in the same way as the example 37, an Al metal release layer was formed, the protrusion-recess pattern of the resist layer was transferred to the magnetic recording layer, an alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 39

In the example 39, Ti was used as the under layer material. Other than this, the example 39 is the same as the example 37. Note, a patterning to the resist layer and a patterning to the mask layer are the same as the example 1.

A Ti under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.0 nm. At this time, a value of a surface roughness was 0.35 nm.

After that, in the same way as the example 37, the Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 40

In the example 40, V was used as the under layer material. Other than this, the example 40 is the same as the example 37. Note, a patterning to the resist layer and a patterning to the mask layer are the same as the example 1.

A V under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.29 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 41

In the example 41, Zn was used as the under layer material. Other than this, the example 41 is the same as the example 37. Note, a patterning to the resist layer and a patterning to the mask layer are the same as the example 1.

A Zn under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.4 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 42

In the example 42, Ni was used as the under layer material. Other than this, the example 42 is the same as the example 37. Note, a patterning to the resist layer and a patterning to the mask layer are the same as the example 1.

A Ni under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.6 nm. At this time, a value of a surface roughness was 0.32 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 43

In the example 43, Mo was used as the under layer material. Other than this, the example 43 is the same as the example 37. Note, a patterning to the resist layer and a patterning to the mask layer are the same as the example 1.

A Mo under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 2 nm. At this time, a value of a surface roughness was 0.25 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 44

In the example 44, Cr was used as the under layer material. Other than this, the example 44 is the same as the example 37. Note, a patterning to the resist layer and a patterning to the mask layer are the same as the example 1.

A Cr under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.37 nm. At this time, a value of a surface roughness was 0.28 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 45

In the example 45, Cu was used as the under layer material. Other than this, the example 45 is the same as the example 37. Note, a patterning to the resist layer and a patterning to the mask layer are the same as the example 1.

A Cu under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.4 nm. At this time, a value of a surface roughness was 0.33 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 46

In the example 46, Zr was used as the under layer material. Other than this, the example 46 is the same as the example 37. Note, a patterning to the resist layer and a patterning to the mask layer are the same as the example 1.

A Zr under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 0.95 nm. At this time, a value of a surface roughness was 0.26 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 47

In the example 47, Nb was used as the under layer material. Other than this, the example 47 is the same as the example 37. Note, a patterning to the resist layer and a patterning to the mask layer are the same as the example 1.

An Nb under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.26 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 48

In the example 48, Hf was used as the under layer material. Other than this, the example 48 is the same as the example 37. Note, a patterning to the resist layer and a patterning to the mask layer are the same as the example 1.

An Hf under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.0 nm. At this time, a value of a surface roughness was 0.3 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 49

In the example 49, Ta was used as the under layer material. Other than this, the example 49 is the same as the example 37. Note, a patterning to the resist layer and a patterning to the mask layer are the same as the example 1.

A Ta under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 0.7 nm. At this time, a value of a surface roughness was 0.28 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 50

In the example 50, Ag was used as the under layer material. Other than this, the example 50 is the same as the example 37. Note, a patterning to the resist layer and a patterning to the mask layer are the same as the example 1.

An Ag under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.4 nm. At this time, a value of a surface roughness was 0.37 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 51

In the example 51, Au was used as the under layer material. Other than this, the example 51 is the same as the example 37. Note, a patterning to the resist layer and a patterning to the mask layer are the same as the example 1.

An Au under layer was formed by a DC sputtering method. Ar was used as a process gas, a gas pressure was set at 4.0 Pa, a gas flow rate was set at 35 sccm, an input power was set at 500 W, and a film formation was performed such that a thickness becomes 1.2 nm. At this time, a value of a surface roughness was 0.29 nm.

After that, in the same way as the example 37, an Al metal release layer was formed, the protrusion-recess pattern of the resist layer was transferred to the magnetic recording layer, the alkali stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 52

From the example 52 through an example 66, descriptions are given regarding examples of cases where a film formation order of various under layers and an Al metal release layer are changed. The present example is an example where an Al metal release layer and a Pd under layer are used, and is the same as the example 37 except for that a film formation order of them is changed. Note, a patterning to the resist layer and a patterning to the mask layer are the same as the example 1. Note, a surface roughness of the alloyed release layer was 0.30 nm.

After that, in the same way as the example 37, a Al/Pd alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 53

The example 53 is an example where an Al metal release layer and a Si under layer are used, and is the same as the example 38 except for that a film formation order of them is changed. Note, a patterning to the resist layer and a patterning to the mask layer are the same as the example 1. Note, a surface roughness of the alloyed release layer was 0.33 nm.

After that, in the same way as the example 38, an Al/Si alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 54

The example 54 is an example where an Al metal release layer and a Ti under layer are used, and is the same as the example 39 except for that a film formation order of them is changed. Note, a patterning to the resist layer and a patterning to the mask layer are the same as the example 1. Note, a surface roughness of the alloyed release layer was 0.32 nm.

After that, in the same way as the example 39, an Al/Ti alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 55

The example 55 is an example where an Al metal release layer and a V under layer are used, and is the same as the example 40 except for that a film formation order of them is changed. Note, a patterning to the resist layer and a patterning to the mask layer are the same as the example 1. Note, a surface roughness of an alloyed release layer was 0.32 nm.

After that, in the same way as the example 40, an Al/V alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 56

The example 56 is an example where an Al metal release layer and a Zn under layer are used, and is the same as the example 41 except for that a film formation order of them is changed. Note, a patterning to the resist layer and a patterning to the mask layer are the same as the example 1. Note, a surface roughness of the alloyed release layer was 0.38 nm.

After that, in the same way as the example 41, an Al/Zn alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 57

The example 57 is an example where an Al metal release layer and a Ni under layer are used, and is the same as the example 42 except for that a film formation order of them is changed. Note, a patterning to the resist layer and a patterning to the mask layer are the same as the example 1. Note, a surface roughness of the alloyed release layer was 0.35 nm.

After that, in the same way as the example 42, an Al/Ni alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 58

The example 58 is an example where an Al metal release layer and a Mo under layer are used, and is the same as the example 43 except for that a film formation order of them is changed. Note, a patterning to the resist layer and a patterning to the mask layer are the same as the example 1. Note, a surface roughness of the alloyed release layer was 0.28 nm.

After that, in the same way as the example 43, an Al/Mo alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 59

The example 59 is an example where an Al metal release layer and a Cr under layer are used, and is the same as the example 44 except for that a film formation order of them is changed. Note, a patterning to the resist layer and a patterning to the mask layer are the same as the example 1. Note, a surface roughness of the alloyed release layer was 0.25 nm.

After that, in the same way as the example 44, an Al/Cr alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 60

The example 60 is an example where an Al metal release layer and a Cu under layer are used, and is the same as the example 45 except for that a film formation order of them is changed. Note, a patterning to the resist layer and a patterning to the mask layer are the same as the example 1. Note, a surface roughness of the alloyed release layer was 0.31 nm.

After that, in the same way as the example 45, an Al/Cu alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 61

The example 61 is an example where an Al metal release layer and a Zr under layer are used, and is the same as the example 46 except for that a film formation order of them is changed. Note, a patterning to the resist layer and a patterning to the mask layer are the same as the example 1. Note, a surface roughness of the alloyed release layer was 0.24 nm.

After that, in the same way as the example 46, an Al/Zr alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 62

The example 62 is an example where an Al metal release layer and an Nb under layer are used, and is the same as the example 47 except for that a film formation order of them is changed. Note, a patterning to the resist layer and a patterning to the mask layer are the same as the example 1. Note, a surface roughness of an alloyed release layer was 0.32 nm.

After that, in the same way as the example 47, an Al/Nb alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 63

The example 63 is an example where an Al metal release layer and a Hf under layer are used, and is the same as the example 48 except for that a film formation order of them is changed. Note, a patterning to the resist layer and a patterning to the mask layer are the same as the example 1. Note, a surface roughness of the alloyed release layer was 0.28 nm.

After that, in the same way as the example 48, an Al/Hf alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 64

The example 64 is an example where an Al metal release layer and a Ta under layer are used, and is the same as the example 49 except for that a film formation order of them is changed. Note, a patterning to the resist layer and a patterning to the mask layer are the same as the example 1. Note, a surface roughness of the alloyed release layer was 0.26 nm.

After that, in the same way as the example 49, an Al/Ta alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 65

The example 65 is an example where an Al metal release layer and an Ag under layer are used, and is the same as the example 50 except for that a film formation order of them is changed. Note, a patterning to the resist layer and a patterning to the mask layer are the same as the example 1. Note, a surface roughness of the alloyed release layer was 0.35 nm.

After that, in the same way as the example 50, an Al/Ag alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 66

The example 66 is an example where an Al metal release layer and an Au under layer are used, and is the same as the example 51 except for that a film formation order of them is changed. Note, a patterning to the resist layer and a patterning to the mask layer are the same as the example 1. Note, a surface roughness of an alloyed release layer was 0.27 nm.

After that, in the same way as the example 51, an Al/Au alloyed release layer was formed, the protrusion-recess pattern of the resist layer was transferred to the magnetic recording layer, the stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 67

The example 67 is an example of a case where a thick Al metal release layer is provided, and a description of a case where Pd, which is a typical material for an under layer, is used is given. In the same way as the example 37, a Pd under layer and an Al metal release layer were formed by a DC sputtering method. The Pd under layer was formed to have a film thickness of 1.5 nm. At this time, a surface roughness was 0.32 nm. Then, the Al metal release layer was formed to have a thickness of 6.5 nm. A surface roughness after alloying was 0.30 nm, and it was confirmed that roughness reduction effect was decreased.

After that, in the same way as the example 1, the protrusion-recess pattern of the resist layer was transferred to the magnetic recording layer, the alkali stripping step, which is the same as the one of the example 37, was performed, and a magnetic recording medium having the protrusion-recess pattern was obtained. The pattern of the manufactured magnetic recording medium was observed, and it was recognized that the Al metal release layer was stripped favorably. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 68

The example 68 is an example of a case where a thin under layer is provided, and a description of a case where Pd, which is a typical material for an under layer, is used is given. In the same way as the example 37, a Pd under layer and an Al metal release layer were formed by a DC sputtering method. The Pd under layer was formed to have a film thickness of 0.3 nm. At this time, a surface roughness was 0.23 nm. Then, the Al metal release layer was formed to have a thickness of 4.5 nm. A surface roughness after alloying was 0.27 nm, and it was confirmed that roughness was increased.

After that, in the same way as the example 1, the protrusion-recess pattern of the resist layer was transferred to the magnetic recording layer, the alkali stripping step was performed, and a magnetic recording medium having the protrusion-recess pattern was obtained. The pattern of the manufactured magnetic recording medium was observed, and it was recognized that the Al metal release layer was stripped favorably. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 69

The example 36 is an example of a case where a thick under layer is provided, and a description of a case where Pd, which is a typical material, is used is given. In the same way as the example 37, a Pd under layer was formed by a DC sputtering method. A film thickness was set at 5.5 nm, and at this time, a surface roughness was 0.4 nm. Then, an Al metal release layer was formed to have a thickness of 4.5 nm in the same way as the example 37. A surface roughness after alloying of them was measured and the surface roughness was 0.38 nm, and it was confirmed that surface roughness reduction effect was decreased.

After that, in the same way as the example 37, a Pd/Al alloyed release layer was formed, the protrusion-recess pattern of the resist layer was transferred to the magnetic recording layer, the alkali stripping step was performed, and a magnetic recording medium having the protrusion-recess pattern was obtained. The pattern of the manufactured magnetic recording medium was observed. The W metal release layer was stripped, but a residue of approximately 0.3 nm remains in a lower layer portion of the thick film Pd. It was recognized that a patterned protective film was formed. A head flying height with respect to the obtained magnetic recording medium was measured by a glide height tester, and a flying property evaluation was performed. A result thereof passed a flying height of 10 nm, which is a necessary standard for performing a reading-writing evaluation of the medium, and simultaneously it was confirmed that a contact frequency to the medium surface during the movement of the head was increased.

Example 70

From the example 70 through an example 71, descriptions are given regarding examples of a case where a metal release layer material is used as an under layer material. Herein, Al was used for an under layer, and W was used for a metal release layer. In other words, a stripping process in which two different types of a stripping material and a stripping solution are used was performed. Note, a patterning from the resist layer to the magnetic recording layer and an acid stripping are the same as the example 1.

An Al film and a W film were prepared by a DC sputtering in the same way as one from the example 1 and the example 37. A film thickness of the Al film was set at 1.5 nm, and a measured surface roughness at this time was 0.33 nm. The W film was formed to have a film thickness of 4.5 nm. Note, a surface roughness of the release layer after alloying was 0.29 nm.

After that, in the same way as the example 1, the protrusion-recess pattern of the resist layer was transferred to the magnetic recording layer, the acid stripping step was performed, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 71

The example 71 is a modified example of the example 70, and is the same as the example 70 except for the new performance of an alkali striping after the acid stripping of the alloyed release layer.

An Al film and a W film were prepared by a DC sputtering in the same way as one from the example 1 and the example 37. A film thickness of the Al film was set at 1.5 nm, and a measured surface roughness at this time was 0.33 nm. The W film was formed to have a film thickness of 4.5 nm. Note, a surface roughness of the release layer after alloying was 0.29 nm.

In the same way as the example 1, an Al/W alloyed release layer was stripped by hydrogen peroxide water, and after that, an Al alloy residue was stripped by an alkali solution in order to improve a medium surface property of the magnetic recording layer. Specifically, sodium hydroxide solution that was prepared to have a mass weight percent concentration of 0.01% was used, and the sample was immersed for one minute and was washed by using pure water.

As described above, a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium. As compared to the example 70, the contact frequency of the moving head to the medium surface was decreased, and it was confirmed that the flying property was improved.

Example 72

From the example 72 through an example 73, descriptions are given regarding examples of a case where a metal release layer material is used as an under layer material. Herein, W was used for an under layer, and Al was used for a metal release layer. Note, the example 72 is the same as the example 73 except for that a film formation order of the under layer and the metal release layer is changed.

A W film and an Al film were formed by a DC sputtering method. A film thickness of the W film was set at 1.5 nm, and a measured surface roughness at this time was 0.31 nm. The Al film was formed to have a film thickness of 4 nm. At this time, a surface roughness was 0.29 nm.

The release layer was stripped by using an alkali solution. Specifically, sodium hydroxide solution that was prepared to have a mass weight percent concentration of 0.05% was used, and the sample was immersed for 5 minute and was washed by using pure water.

As described above, a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium.

Example 73

The example 73 is a modified example of the example 72, and is the same as the example 72 except for the new performance of an acid striping after the alkali stripping of the alloyed release layer.

In the same way as the example 72, a W/Al alloyed release layer was stripped by sodium hydroxide solution, and after that, a W alloy residue was stripped by an acid solution in order to improve a medium surface property of the magnetic recording layer. Specifically, hydrogen peroxide water that was prepared to have a mass weight percent concentration of 0.5% was used, and the sample was immersed for 3 minute and was washed by using pure water.

As described above, a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium. As compared to the example 72, the contact frequency of the moving head to the medium surface was decreased, and it was confirmed that the flying property was improved.

Comparative Example 1

The comparative example 1 through a comparative example 4 are examples of a case where an under layer for roughness reduction is not provided. The present example is a case where only a W metal release layer is used. Note, a protrusion-recess pattern transfer from the resist layer to the magnetic recording layer and an acid stripping step are the same as the example 1.

Figure 13:
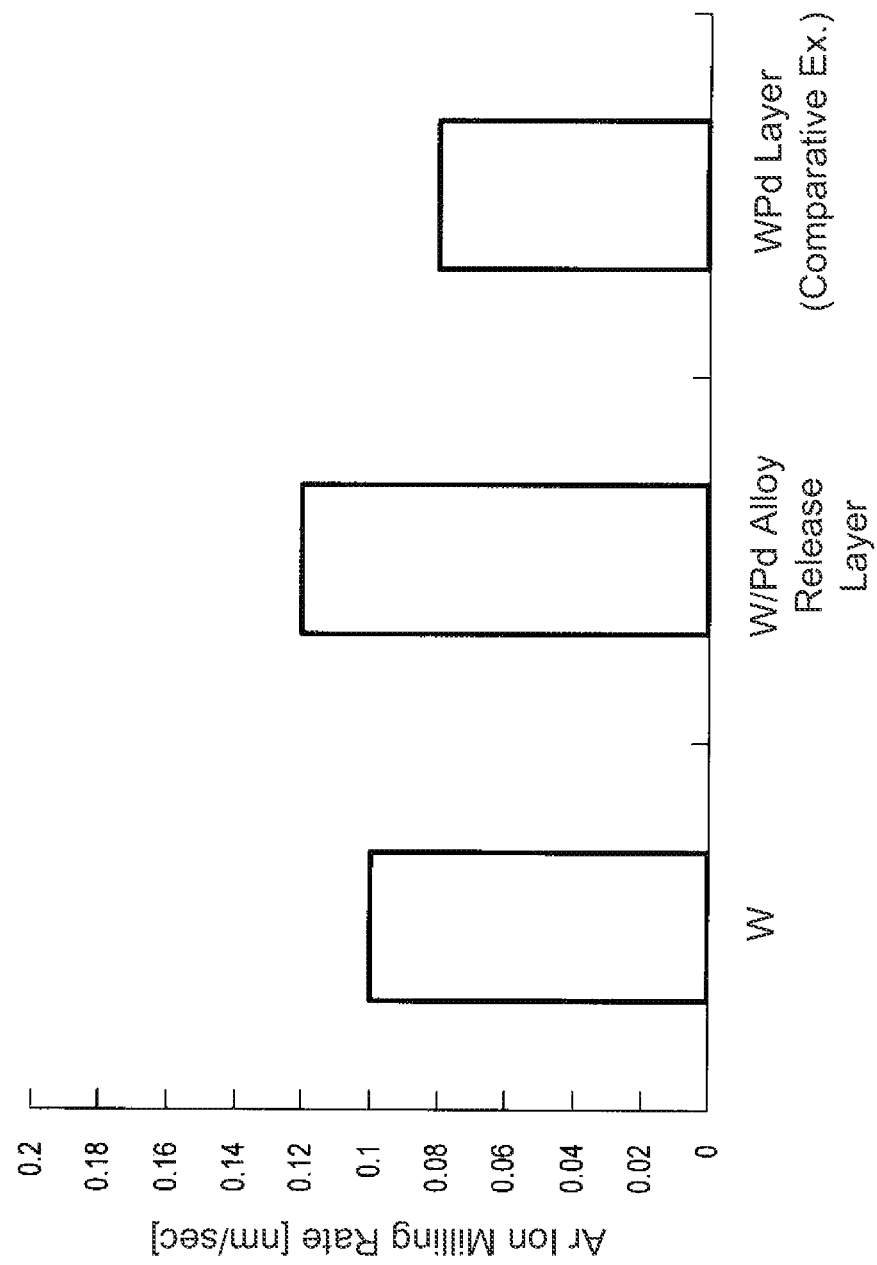
FIG. 13 is a graph for explaining an example of an Ar ion milling rate according to the embodiments.

A W film was formed on the magnetic recording layer by a DC sputtering method so as to have a film thickness of 6 nm. At this time, a measured surface roughness was 0.48 nm. Also, an Ar ion milling rate of the release layer was measured as illustrated in FIG. 13, and the milling rate was decreased than that of the alloyed release layer and it was confirmed that a processability was degraded.

Figure 14:
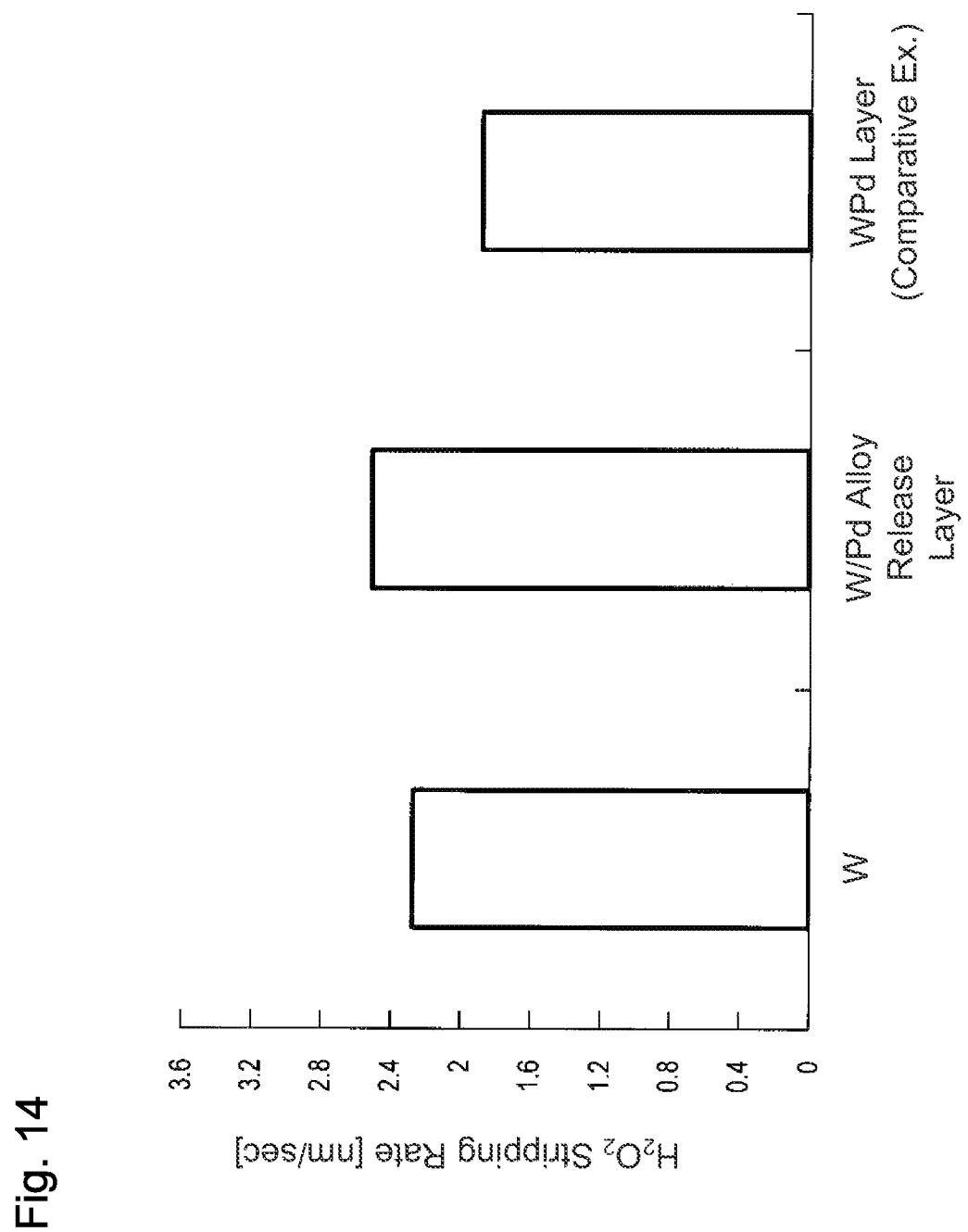
FIG. 14 is a graph for explaining an example of an $H_2O_2$ stripping rate according to the embodiments.

After that, the protrusion-recess pattern was formed in the same way as the example 1 and an acid stripping was performed, and thereby a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium, and simultaneously it was confirmed that a contact frequency to the medium surface during the movement of the head was increased. As illustrated in FIG. 14, a stripping rate of a consecutive film in a case where hydrogen peroxide water is used was decreased than that of the alloyed release layer, and it was confirmed that the striping property was degraded. Also, along with the increase in the surface roughness, it was recognized that the size variation of the pattern after the process was increased.

Comparative Example 2

The comparative example 2 is a case where only an Al metal release layer is used as a release layer. Note, a protrusion-recess pattern transfer from the resist layer to the magnetic recording layer and an alkali stripping step are the same as the example 37.

Figure 15:
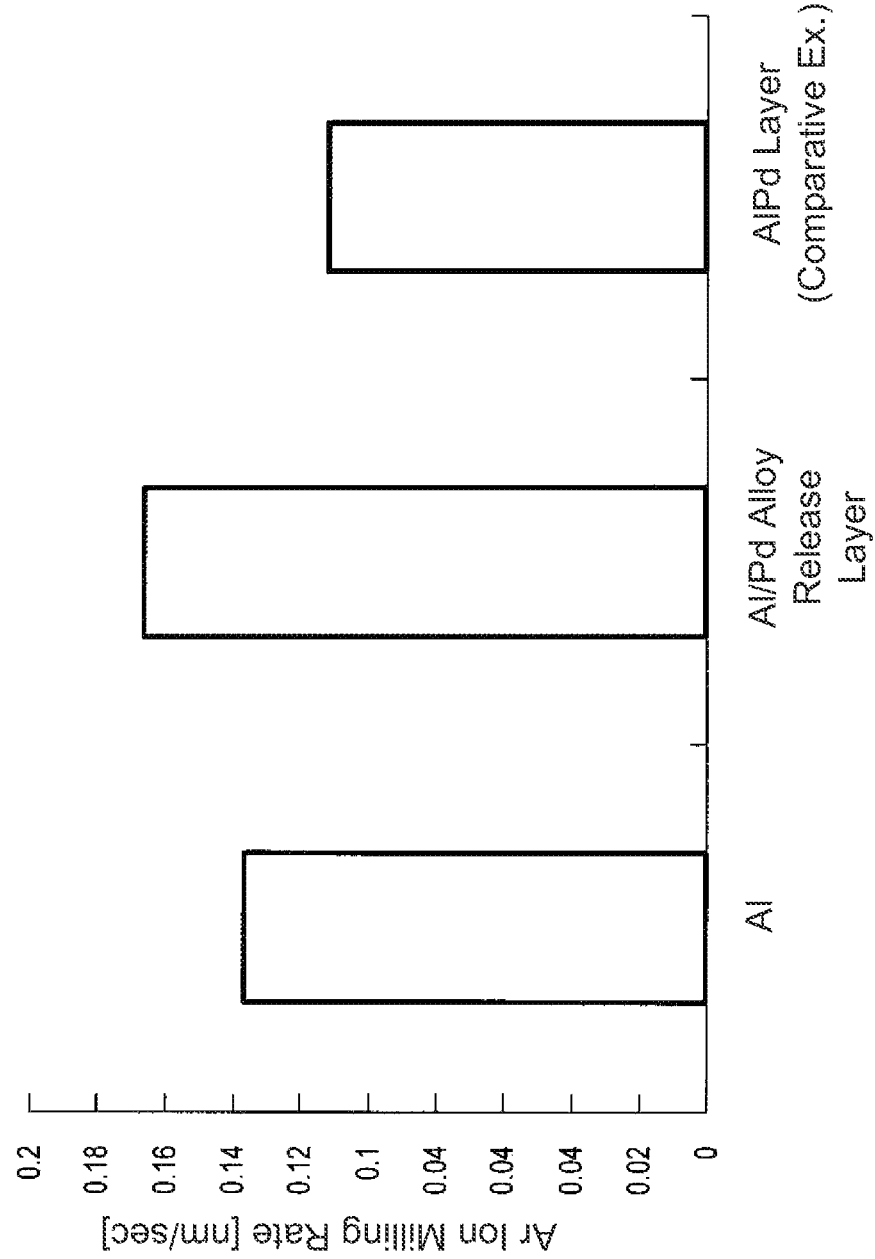
FIG. 15 is a graph for explaining an example of an Ar ion milling rate according to the embodiments.

An Al film was formed on the magnetic recording layer by a DC sputtering method so as to have a film thickness of 6 nm. At this time, a measured surface roughness was 0.55 nm. Also, an Ar ion milling rate of the release layer was measured as illustrated in FIG. 15, and the milling rate was decreased than that of the alloyed release layer and it was confirmed that a processability was degraded.

Figure 16:
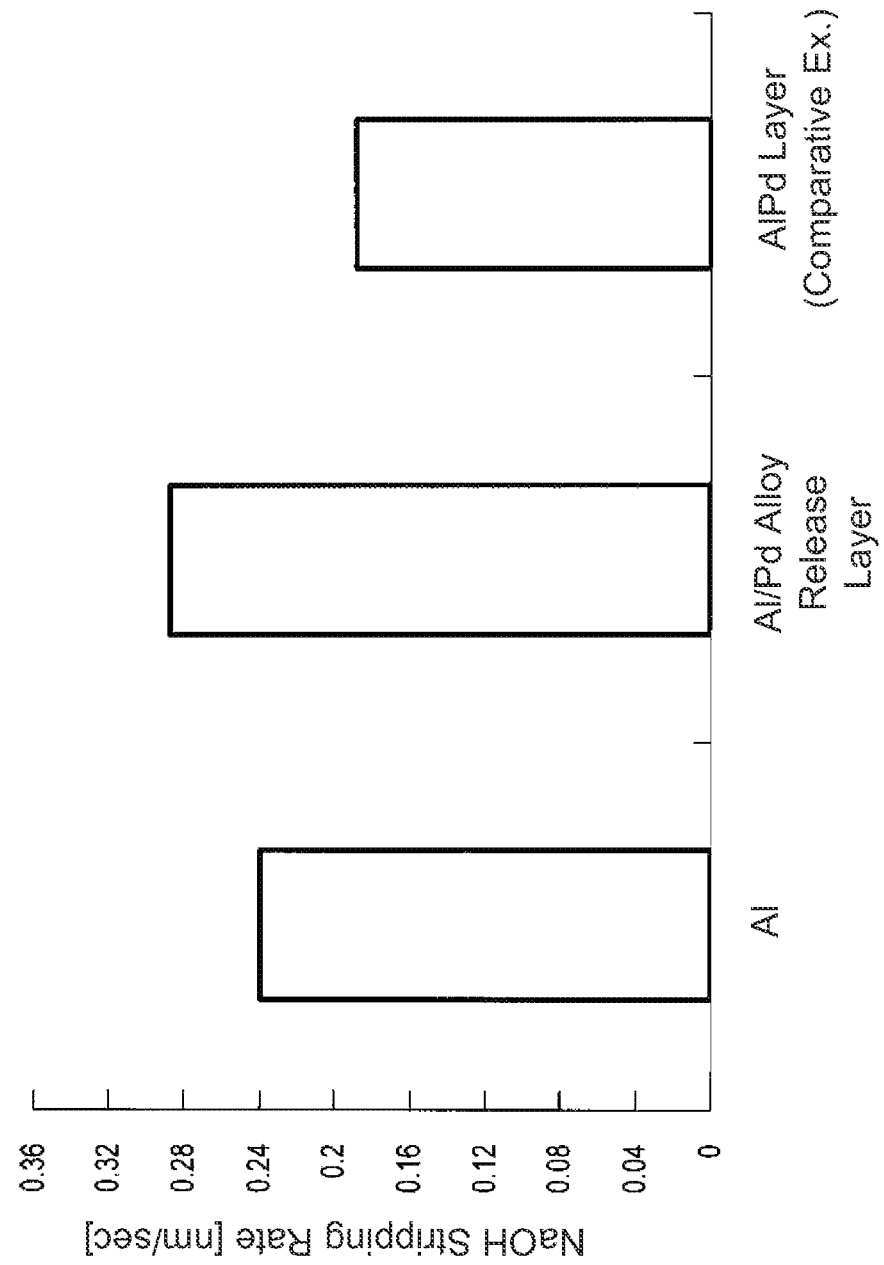
FIG. 16 is a view for explaining an example of a NaOH stripping rate according to the embodiments.

After that, the protrusion-recess pattern was formed in the same way as the example 37 and an alkali stripping was performed, and thereby a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium, and simultaneously it was confirmed that a contact frequency to the medium surface during the movement of the head was increased. As illustrated in FIG. 16, a stripping rate of a consecutive film in a case where sodium hydroxide solution is used was decreased than that of the alloyed release layer, and it was confirmed that the striping property was degraded. Also, along with the increase in the surface roughness, it was recognized that the size variation of the pattern after the process was increased.

Comparative Example 3

The comparative example 3 is a case where an alloy material is used as a release layer. In the present example, a description is given of an example where a W—Pd alloy is used. Note, a protrusion-recess pattern transfer from the resist layer to the magnetic recording layer and an acid stripping step are the same as the example 1.

A W—Pd release layer was formed by a DC sputtering method. A W—Pd alloy was used as a target, and was formed on the magnetic recording layer so as to have a film thickness of 6 nm. At this time, a measured surface roughness was 0.52 nm. Also, an Ar ion milling rate of the release layer was measured as illustrated in FIG. 13, and the milling rate was decreased than that of the alloyed release layer and it was confirmed that processability was degraded.

After that, the protrusion-recess pattern was formed in the same way as the example 1, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium, and simultaneously it was confirmed that a contact frequency to the medium surface during the movement of the head was increased. As illustrated in FIG. 14, a stripping rate of a consecutive film in a case where hydrogen peroxide water is used was decreased than that of the alloyed release layer, and it was confirmed that the striping property was degraded. Also, along with the increase in the surface roughness and the decrease in the milling rate, it was recognized that the size variation of the pattern after the process was increased.

Comparative Example 4

The comparative example 4 is a case where an alloy material is formed in a single layer. In the present example, a description is given of an example where a Al—Pd alloy is used. Note, a protrusion-recess pattern transfer from the resist layer to the magnetic recording layer and an acid stripping step are the same as the example 37.

An Al—Pd release layer was formed by a DC sputtering method. An Al—Pd alloy was used as a target, and was formed on the magnetic recording layer so as to have a film thickness of 6 nm. At this time, a surface roughness was 0.49 nm. Also, an Ar ion milling rate of the release layer was measured as illustrated in FIG. 15, and the milling rate was decreased than that of the alloyed release layer and it was confirmed that a processability was degraded.

After that, the protrusion-recess pattern was formed in the same way as the example 37, and a magnetic recording medium having the protrusion-recess pattern was obtained. A head flying height with respect to the obtained magnetic recording medium was measured by a glide height tester, and a flying property evaluation was performed. A result thereof passed a flying height of 10 nm, which is a necessary standard for performing a reading-writing evaluation of the medium, and simultaneously it was confirmed that a contact frequency to the medium surface during the movement of the head was increased. As illustrated in FIG. 16, a stripping rate of a consecutive film in a case where sodium hydroxide solution is used was decreased than that of the alloyed release layer, and it was confirmed that the striping property was degraded. Also, along with the increase in the surface roughness and the decrease in the milling rate, it was recognized that the size variation of the pattern after the process was increased.

The obtained results according to the above-described examples 1 through 73 and the comparative examples 1 through 4 are shown in the following tables 1 through 5.

TABLE 1

| Example | Under Layer | Metal Release Layer | Stripping Solution | Flying Property | Resist Process Method | Roughness | Reactivity |
|---|---|---|---|---|---|---|---|
| 1 | Pd | W | $H_2O_2$ | 10 nm | EB | Good | Good |
| 2 | Pd | W | $H_2O_2$ | 10 nm | Self-Assembling | Good | Good |
| 3 | Pd | W | $H_2O_2$ | 10 nm | Metal Particles | Good | Good |
| 4 | Pd | W | $H_2O_2$ | 10 nm | Nanoimprint | Good | Good |
| 5 | Si | W | $H_2O_2$ | 10 nm | Lithography | Good | Good |
| 6 | Ti | W | $H_2O_2$ | 10 nm | Lithography | Good | Good |
| 7 | V | W | $H_2O_2$ | 10 nm | Lithography | Good | Good |
| 8 | Zn | W | $H_2O_2$ | 10 nm | Lithography | Good | Good |
| 9 | Ni | W | $H_2O_2$ | 10 nm | Lithography | Good | Good |
| 10 | Mo | W | $H_2O_2$ | 10 nm | Lithography | Good | Good |
| 11 | Cr | W | $H_2O_2$ | 10 nm | Lithography | Good | Good |
| 12 | Cu | W | $H_2O_2$ | 10 nm | Lithography | Good | Good |
| 13 | Zr | W | $H_2O_2$ | 10 nm | Lithography | Good | Good |
| 14 | Nb | W | $H_2O_2$ | 10 nm | Lithography | Good | Good |
| 15 | Hf | W | $H_2O_2$ | 10 nm | Lithography | Good | Good |
| 16 | Ta | W | $H_2O_2$ | 10 nm | Lithography | Good | Good |
| 17 | Ag | W | $H_2O_2$ | 10 nm | Lithography | Good | Good |
| 18 | Au | W | $H_2O_2$ | 10 nm | Lithography | Good | Good |

TABLE 2

| Example | Under Layer | Metal Release Layer | Stripping Solution | Flying Property | Resist Process Method | Roughness | Reactivity |
|---|---|---|---|---|---|---|---|
| 19 | W | Pd | $H_2O_2$ | 10 nm | Lithography | Good | Good |
| 20 | W | Si | $H_2O_2$ | 10 nm | Lithography | Good | Good |
| 21 | W | Ti | $H_2O_2$ | 10 nm | Lithography | Good | Good |
| 22 | W | V | $H_2O_2$ | 10 nm | Nanoimprint | Good | Good |
| 23 | W | Zn | $H_2O_2$ | 10 nm | Lithography | Good | Good |
| 24 | W | Ni | $H_2O_2$ | 10 nm | Lithography | Good | Good |
| 25 | W | Mo | $H_2O_2$ | 10 nm | Lithography | Good | Good |
| 26 | W | Cr | $H_2O_2$ | 10 nm | Lithography | Good | Good |
| 27 | W | Cu | $H_2O_2$ | 10 nm | Lithography | Good | Good |
| 28 | W | Zr | $H_2O_2$ | 10 nm | Lithography | Good | Good |
| 29 | W | Nb | $H_2O_2$ | 10 nm | Lithography | Good | Good |
| 30 | W | Hf | $H_2O_2$ | 10 nm | Lithography | Good | Good |
| 31 | W | Ta | $H_2O_2$ | 10 nm | Lithography | Good | Good |
| 32 | W | Ag | $H_2O_2$ | 10 nm | Lithography | Good | Good |
| 33 | W | Au | $H_2O_2$ | 10 nm | Lithography | Good | Good |
| 34 | Pd | Thick W | $H_2O_2$ | 10 nm | Lithography | Large | Good |
| 35 | Thin PD (Small Ra) | W | $H_2O_2$ | 10 nm | Lithography | Large | Good |
| 36 | Thick Pd | W | $H_2O_2$ | Δ | Lithography | Large | Not Good |

TABLE 3

| Example | Under Layer | Metal Release Layer | Stripping Solution | Flying Property | Resist Process Method | Roughness | Reactivity |
|---|---|---|---|---|---|---|---|
| 37 | Pd | Al | NaOH | 10 nm | Lithography | Good | Good |
| 38 | Si | Al | NaOH | 10 nm | Lithography | Good | Good |
| 39 | Ti | Al | NaOH | 10 nm | Lithography | Good | Good |
| 40 | V | Al | NaOH | 10 nm | Nanoimprint | Good | Good |
| 41 | Zn | Al | NaOH | 10 nm | Lithography | Good | Good |
| 42 | Ni | Al | NaOH | 10 nm | Lithography | Good | Good |
| 43 | Mo | Al | NaOH | 10 nm | Lithography | Good | Good |
| 44 | Cr | Al | NaOH | 10 nm | Lithography | Good | Good |
| 45 | Cu | Al | NaOH | 10 nm | Lithography | Good | Good |
| 46 | Zr | Al | NaOH | 10 nm | Lithography | Good | Good |
| 47 | Nb | Al | NaOH | 10 nm | Lithography | Good | Good |
| 48 | Hf | Al | NaOH | 10 nm | Lithography | Good | Good |
| 49 | Ta | Al | NaOH | 10 nm | Lithography | Good | Good |
| 50 | Ag | Al | NaOH | 10 nm | Lithography | Good | Good |
| 51 | Au | Al | NaOH | 10 nm | Lithography | Good | Good |

TABLE 4

| Example | Under Layer | Metal Release Layer | Stripping Solution | Flying Property | Resist Process Method | Roughness | Reactivity |
|---|---|---|---|---|---|---|---|
| 52 | Al | Pd | NaOH | 10 nm | Lithography | Good | Good |
| 53 | Al | Si | NaOH | 10 nm | Lithography | Good | Good |
| 54 | Al | Ti | NaOH | 10 nm | Lithography | Good | Good |
| 55 | Al | V | NaOH | 10 nm | Lithography | Good | Good |
| 56 | Al | Zn | NaOH | 10 nm | Lithography | Good | Good |
| 57 | Al | Ni | NaOH | 10 nm | Lithography | Good | Good |
| 58 | Al | Mo | NaOH | 10 nm | Lithography | Good | Good |
| 59 | Al | Cr | NaOH | 10 nm | Lithography | Good | Good |
| 60 | Al | Cu | NaOH | 10 nm | Lithography | Good | Good |
| 61 | Al | Zr | NaOH | 10 nm | Lithography | Good | Good |
| 62 | Al | Nb | NaOH | 10 nm | Lithography | Good | Good |
| 63 | Al | Hf | NaOH | 10 nm | Lithography | Good | Good |
| 64 | Al | Ta | NaOH | 10 nm | Lithography | Good | Good |
| 65 | Al | Ag | NaOH | 10 nm | Lithography | Good | Good |
| 66 | Al | Au | NaOH | 10 nm | Lithography | Good | Good |
| 67 | Pd | Thick Al | NaOH | 10 nm | Lithography | Large | Good |
| 68 | Thin Pd (Small Ra) | Al | NaOH | 10 nm | Lithography | Large | Good |
| 69 | Thick Pd | Al | NaOH | Δ | Lithography | Large | Not Good |

TABLE 5

| | Example | Under Layer | Metal Release Layer | Stripping Solution | Flying Property | Resist Process Method | Roughness | Reactivity |
|---|---|---|---|---|---|---|---|---|
| Example | 70 | Al | W | H$_2$O$_2$ | 10 nm | Lithography | Good | Good |
| | 71 | Al | W | H$_2$O$_2$ → NaOH | 10 nm | Lithography | Good | Good |
| | 72 | W | Al | NaOH | 10 nm | Lithography | Good | Good |
| | 73 | W | Al | NaOH → H$_2$O$_2$ | 10 nm | Lithography | Good | Good |
| Comparative Example | 1 | — | W | H$_2$O$_2$ | Δ | Lithography | Large | Good |
| | 2 | — | Al | NaOH | Δ | Lithography | Large | Good |
| | 3 | — | W—Pd Alloy | H$_2$O$_2$ | Δ | Lithography | Good | Not Good |
| | 4 | — | Al—Pd Alloy | NaOH | Δ | Lithography | Good | Not Good |

While certain embodiments have been described, these embodiments have been presented by way of example only; and are not intended to limit the scope of the inventions. Indeed, the novel embodiments described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirits of the inventions.

What is claimed is:

1. A manufacturing method of a magnetic recording medium, comprising:

forming a magnetic recording layer on a substrate;

forming a first layer and a second layer on the magnetic recording layer and forming an alloyed release layer by alloying the first layer and the second layer;

forming a mask layer on the alloyed release layer;

forming a resist layer on the mask layer;

patterning the resist layer according to a protrusion-recess pattern;

transferring the protrusion-recess pattern to the mask layer;

transferring the protrusion-recess pattern to the alloyed release layer;

transferring the protrusion-recess pattern to the magnetic recording layer and providing openings in said magnetic recording layer to said substrate according to said protrusion-recess pattern in said alloyed release layer; and removing the alloyed release layer by using a stripping solution, wherein the first and second layers are each a different one of a metal layer and an under layer of the alloyed release layer, and a surface roughness of the under layer is greater than a surface roughness of the metal layer.

2. The manufacturing method of the magnetic recording medium according to claim 1, wherein the metal release layer includes a metal selected from a group of tungsten and aluminum.

3. The manufacturing method of the magnetic recording medium according to claim 1, wherein the under layer contains a metal selected from a group of silicon, palladium, titanium, vanadium, zinc, nickel, molybdenum, chromium, copper, zirconium, niobium, hafnium, tantalum, silver, and gold.

4. The manufacturing method of the magnetic recording medium according to claim 1, wherein a surface roughness of the alloyed release layer is 0.6 nm or less.

5. The manufacturing method of the magnetic recording medium according to claim 1, wherein the resist layer is a self-assembling film that has at least two different types of polymer chains.

6. The manufacturing method of the magnetic recording medium according to claim 1, wherein the resist layer is patterned by nanoimprinting.

7. The manufacturing method of the magnetic recording medium according to claim 1, wherein the resist layer is formed of at least one type of a metal particle.

8. The manufacturing method as in claim 1, wherein forming the alloyed release layer by alloying the under layer and the metal release layer include thermal annealing.

9. The manufacturing method as in claim 1, further comprising:

coating said substrate, said magnetic recording layer, and said protrusion-recess pattern extending through said magnetic recording layer to establish a planar top surface with a diamond like carbon protective coating.

10. A manufacturing method of a magnetic recording medium, comprising:

forming a magnetic recording layer on a substrate;

forming a first layer and a second layer on the magnetic recording layer and forming an alloyed release layer by alloying the first layer and the second layer;

forming a mask layer on the alloyed release layer;

forming a resist layer on the mask layer;

patterning the resist layer according to a protrusion-recess pattern;

transferring the protrusion-recess pattern to the mask layer;

transferring the protrusion-recess pattern to the alloyed release layer;

transferring the protrusion-recess pattern to the magnetic recording layer and providing openings in said magnetic recording layer to said substrate according to said protrusion-recess pattern in said alloyed release layer; and dissolving and removing the alloyed release layer by using one removal process selected from a group consisting of dry etching and wet etching, wherein the first and second layers are each a different one of a metal release layer and an under layer, and a surface roughness of the under layer is greater than a surface roughness of the metal release layer.

* * * * *